United States Patent
Ziauddin et al.

(10) Patent No.: US 10,223,422 B2
(45) Date of Patent: Mar. 5, 2019

(54) PRUNING DISK BLOCKS IN A RELATIONAL DATABASE MANAGEMENT SYSTEM

(71) Applicant: Oracle International Corporation, Redwood Shores, CA (US)

(72) Inventors: Mohamed Ziauddin, Pleasanton, CA (US); Andrew Witkowski, Foster City, CA (US)

(73) Assignee: Oracle International Corporation, Redwood Shores, CA (US)

(*) Notice: Subject to any disclaimer, the term of this patent is extended or adjusted under 35 U.S.C. 154(b) by 723 days.

(21) Appl. No.: 14/671,510

(22) Filed: Mar. 27, 2015

(65) Prior Publication Data

US 2015/0199407 A1 Jul. 16, 2015

Related U.S. Application Data

(63) Continuation of application No. 13/629,907, filed on Sep. 28, 2012, now Pat. No. 8,996,544.

(51) Int. Cl.
*G06F 17/30* (2006.01)

(52) U.S. Cl.
CPC .. *G06F 17/30492* (2013.01); *G06F 17/30584* (2013.01); *G06F 17/30592* (2013.01); *G06F 17/30598* (2013.01)

(58) Field of Classification Search
CPC .................................................. G06F 17/30
See application file for complete search history.

(56) References Cited

U.S. PATENT DOCUMENTS

| | | | |
|---|---|---|---|
| 6,269,375 B1* | 7/2001 | Ruddy | G06F 17/30339 707/999.101 |
| 6,374,232 B1* | 4/2002 | Dageville | G06F 17/30327 707/999.002 |
| 6,484,179 B1 | 11/2002 | Roccaforte | |
| 6,636,870 B2 | 10/2003 | Roccaforte | |
| 6,662,174 B2 | 12/2003 | Shah et al. | |
| 6,732,115 B2 | 5/2004 | Shah et al. | |
| 6,748,394 B2 | 6/2004 | Shah et al. | |
| 6,778,996 B2 | 8/2004 | Roccaforte | |

(Continued)

OTHER PUBLICATIONS

Abadi, D. et al., "Column-Stores vs. Row-Stores: How Different Are They Really?" *Sigmod* 2008(14 pages).

(Continued)

*Primary Examiner* — Khanh B Pham
(74) *Attorney, Agent, or Firm* — Hickman Palermo Becker Bingham LLP

(57) ABSTRACT

Techniques are provided for generating a "dimensional zonemap" that allows a database server to avoid scanning disk blocks of a fact table based on filter predicates in a query that qualify one or more dimension tables. The zonemap divides the fact table into sets of contiguous disk blocks referred to as "zones". For each zone, a minimum value and a maximum value for each of one or more "zoned" columns of the dimension tables is determined and maintained in the zonemap. For a query that contains a filter predicate on a zoned column, the predicate value can be compared to the minimum value and maximum value maintained for a zone for that zoned column to determine whether a scan of the disk blocks of the zone can be skipped.

22 Claims, 9 Drawing Sheets

(56) References Cited

U.S. PATENT DOCUMENTS

| | | |
|---|---|---|
| 6,785,666 B1 | 8/2004 | Nareddy et al. |
| 6,804,714 B1 | 10/2004 | Tummalapalli |
| 6,865,575 B1 | 3/2005 | Smith et al. |
| 6,898,608 B2 | 5/2005 | Hopeman et al. |
| 6,920,640 B2 | 7/2005 | Srinivasan et al. |
| 6,941,311 B2 | 9/2005 | Shah et al. |
| 6,965,891 B1* | 11/2005 | Jakobsson ............ G06F 17/3033 707/714 |
| 6,973,457 B1 | 12/2005 | Bastawala et al. |
| 7,007,029 B1 | 2/2006 | Chen |
| 7,028,046 B2 | 4/2006 | Anjur et al. |
| 7,031,953 B2 | 4/2006 | Shah et al. |
| 7,072,897 B2 | 7/2006 | Shah et al. |
| 7,076,507 B1 | 7/2006 | Tarin |
| 7,080,090 B2 | 7/2006 | Shah et al. |
| 7,089,331 B1 | 8/2006 | Gollapudi et al. |
| 7,093,194 B2 | 8/2006 | Nelson |
| 7,103,590 B1 | 9/2006 | Murthy et al. |
| 7,113,951 B2 | 11/2006 | Bourekas |
| 7,143,098 B2 | 11/2006 | Chen et al. |
| 7,167,859 B2 | 1/2007 | Shah et al. |
| 7,228,300 B2 | 6/2007 | Lei et al. |
| 7,233,952 B1 | 6/2007 | Chen |
| 7,287,022 B2 | 10/2007 | Netz et al. |
| 7,313,559 B2 | 12/2007 | Netz et al. |
| 7,315,849 B2 | 1/2008 | Bakalash et al. |
| 7,320,001 B1 | 1/2008 | Chen |
| 7,333,982 B2 | 2/2008 | Bakalash et al. |
| 7,366,730 B2 | 4/2008 | Greenfield et al. |
| 7,373,353 B2 | 5/2008 | Adler et al. |
| 7,379,944 B2 | 5/2008 | Adler et al. |
| 7,383,275 B2 | 6/2008 | Chen et al. |
| 7,389,283 B2 | 6/2008 | Adler |
| 7,389,284 B1 | 6/2008 | Surlaker et al. |
| 7,392,248 B2 | 6/2008 | Bakalash et al. |
| 7,346,617 B2 | 8/2008 | Wong |
| 7,415,457 B2 | 8/2008 | Dombroski et al. |
| 7,418,438 B2 | 8/2008 | Gould et al. |
| 7,433,886 B2 | 10/2008 | Rathakrishnan |
| 7,437,372 B2 | 10/2008 | Chen et al. |
| 7,480,662 B1 | 1/2009 | Postapov et al. |
| 7,480,663 B2 | 1/2009 | Colossi et al. |
| 7,502,894 B2 | 3/2009 | Luo |
| 7,505,888 B2 | 3/2009 | Legault et al. |
| 7,558,779 B2 | 7/2009 | Luo |
| 7,593,955 B2 | 9/2009 | Legault et al. |
| 7,610,300 B2 | 10/2009 | Legault et al. |
| 7,610,351 B1 | 10/2009 | Gollaapudi et al. |
| 7,617,235 B2 | 11/2009 | Srinivasan et al. |
| 7,617,312 B2 | 11/2009 | Tummalapalli |
| 7,657,503 B1 | 2/2010 | Cormode et al. |
| 7,657,516 B2 | 2/2010 | Zaman et al. |
| 7,660,823 B2 | 2/2010 | Clover |
| 7,685,092 B2 | 3/2010 | Reichert et al. |
| 7,689,621 B1 | 3/2010 | Huber et al. |
| 7,707,143 B2 | 4/2010 | Bruce et al. |
| 7,716,167 B2 | 5/2010 | Colossi et al. |
| 7,716,172 B2 | 5/2010 | Anjur et al. |
| 7,765,246 B2 | 7/2010 | Basu et al. |
| 7,769,733 B2 | 8/2010 | Chen et al. |
| 7,774,379 B2 | 8/2010 | Basu et al. |
| 7,779,038 B2 | 8/2010 | Adler et al. |
| 7,814,104 B2 | 10/2010 | Raghavan et al. |
| 7,831,615 B2 | 11/2010 | Bailey |
| 7,836,082 B2 | 11/2010 | Adler et al. |
| 7,860,891 B2 | 12/2010 | Adler et al. |
| 7,873,664 B2 | 1/2011 | Andersch et al. |
| 7,873,684 B2 | 1/2011 | Sounder et al. |
| 7,890,546 B2 | 2/2011 | Shah et al. |
| 7,895,191 B2 | 2/2011 | Colossi et al. |
| 7,904,327 B2 | 3/2011 | Phelan et al. |
| 7,930,200 B1 | 4/2011 | McGuirtk et al. |
| 7,949,674 B2 | 5/2011 | Middelfart |
| 7,966,322 B2 | 6/2011 | Clover |
| 7,966,330 B2 | 6/2011 | Raghavan et al. |
| 7,979,425 B2 | 7/2011 | Garg et al. |
| 7,996,378 B2 | 8/2011 | Wang et al. |
| 8,000,996 B1 | 8/2011 | Sanli et al. |
| 8,001,112 B2 | 8/2011 | Dombroski |
| 8,041,670 B2 | 10/2011 | Bakalash et al. |
| 8,051,102 B2 | 11/2011 | Everett |
| 8,065,262 B2 | 11/2011 | Bailey |
| 8,082,239 B2 | 12/2011 | Yang et al. |
| 8,126,871 B2 | 2/2012 | Malloy et al. |
| 8,131,533 B2 | 3/2012 | Legault et al. |
| 8,135,688 B2 | 3/2012 | Shankar et al. |
| 8,150,850 B2 | 4/2012 | Herrnstadt |
| 8,160,917 B1 | 4/2012 | Solanki et al. |
| 8,161,085 B2 | 4/2012 | Souder et al. |
| 8,170,984 B2 | 5/2012 | Bakalash et al. |
| 8,195,602 B2 | 6/2012 | Bakalash et al. |
| 8,195,645 B2 | 6/2012 | Thiebaut-George |
| 8,200,612 B2 | 6/2012 | Soylemez et al. |
| 8,209,280 B2 | 6/2012 | Kearney et al. |
| 8,209,294 B2 | 6/2012 | Shankar et al. |
| 2003/0195898 A1 | 10/2003 | Agarwal et al. |
| 2004/0153435 A1 | 8/2004 | Gudbjartsson et al. |
| 2004/0177065 A1 | 9/2004 | Tropf |
| 2005/0038784 A1* | 2/2005 | Zait ................... G06F 17/30312 707/999.005 |
| 2005/0044102 A1 | 2/2005 | Gupta et al. |
| 2005/0102467 A1 | 5/2005 | Lam et al. |
| 2007/0061287 A1 | 3/2007 | Le et al. |
| 2012/0317096 A1* | 12/2012 | Kaufmann ........ G06F 17/30448 707/718 |
| 2013/0151491 A1 | 6/2013 | Gislason |

OTHER PUBLICATIONS

Dijcks, Jean-Pierre, "A Not So fabulous New Release (The Data Warehouse Insider)", dated Aug. 30, 2009, 9 pages.

Netezza Database Software Technology, "A partial Overview of Netzza Database Software Technology", dated Jun. 21, 2010, 12 pages.

Ronthal, Adam, "Appliances Are Easy to Use", Blog, dated Mar. 27, 2012, 3 pages.

Snow, Dwaine, "FUD Competitors are Spreading on Netezza", dated Jun. 28, 2012, 3 pages.

Howard, Philip, "Netezza: More Than You Might Imagine", Bloor Research, dated Oct. 3, 2006, 6 pages.

DB Technology, "Netezza Questions and Answers", dated Aug. 2, 2009, 5 pages.

DBMS 2: DataBase Management System Services, "Netezza vs. Conventional Data Warehousing RDBMS", dated Sep. 20, 2006, 8 pages.

Big Data Topics, "Using nz_Zonemap to Visualize Netezza's Zone Map Effectiveness", dated Jul. 20, 2012, 5 pages.

NZGuv, Netezza Tips, Tricks and Cool SQL, "With Netezza Always Use Integer Join Keys for Good Compression, Zone Maps, and Joins" dated Nov. 20, 2010, 1 page.

Birmingham, David, "Netezza Underground", "Zone Maps and Data Power", dated Jul. 11, 2011, 5 pages.

Oracle, "Oracle7 Server Concepts", Release 7.3, dated Feb. 1996, 178 pages.

O'Neil et al., "The Star Schema Benchmark and Augmented Fact Table Indexing", dated Aug. 24, 2009, 16 pages.

IBM, "Best Practices Physical Database Design for Data Warehouse Environments", dated 2012, 70 pages.

IBM DB2 Universal Database, "Administration Guide: Planning", IBM, dated Jan. 1, 2004, 102 pages.

Chen et al., "Adjoined Dimension Colum Clustering to Improve Data Warehouse Query Performance", IEEE, dated 2008, 4 pages.

Bhattacharjee et al., "Efficient Query Processing for Multi-Dimensionally Clustered Tables in DB2", Proceedings 2003 VLDB Conference, dated Jan. 1, 2003, 12 pages.

* cited by examiner

| "STORES" (TABLE 102) | | | |
|---|---|---|---|
| STORE-ID | MANAGER | CITY | STATE |
| 1020 | JOHNSON | SAN JOSE | CA |
| ... | | | |
| 5034 | SMITH | NEW YORK | NY |

| "PRODUCTS" (TABLE 104) | | | |
|---|---|---|---|
| PRODUCT-ID | SOURCE | PARTS | COST |
| 960 | HASBRO | 5 | $564 |
| ... | | | |
| 572 | NIKE | 2 | $23 |

| "SALES" (TABLE 106) | | | |
|---|---|---|---|
| AMOUNT | STORE-ID | PRODUCT-ID | DATE |
| $234.56 | 1020 | 960 | 12/15/05 |
| ... | | | |
| $769.34 | 1020 | 570 | 7/6/06 |

FIG. 3

| order_key | ship_date | receipt_date | destination | quantity |
|---|---|---|---|---|
| 1 | 1-1-2008 | 1-10-2008 | SFO | 100 |
| 2 | 1-2-2008 | 1-10-2008 | SFO | 200 |
| 3 | 1-3-2008 | 1-9-2008 | SFO | 100 |
| 4 | 1-5-2008 | 1-10-2008 | SAN | 300 |
| 5 | 1-10-2008 | 1-15-2008 | SFO | 100 |
| 6 | 1-12-2008 | 1-16-2008 | SFO | 200 |
| 7 | 1-13-2008 | 1-20-2008 | SFO | 100 |
| 8 | 1-15-2008 | 1-30-2008 | SJC | 300 |

| start_block_no | zone_id | min_order_key | max_order_key | min_ship_date | max_ship_date |
|---|---|---|---|---|---|
| 1 | 1 | 1 | 4 | 1-1-2008 | 1-5-2008 |
| 3 | 2 | 5 | 8 | 1-10-2008 | 1-15-2008 |

PRUNING DISK BLOCKS IN A RELATIONAL DATABASE MANAGEMENT SYSTEM

CROSS-REFERENCE TO RELATED APPLICATION

This application claims the benefit as a Continuation of application Ser. No. 13/629,907, filed Sep. 28, 2012, the entire contents of which is hereby incorporated by reference as if fully set forth herein, under 35 U.S.C. § 120. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates to relational database management systems and, more specifically, to techniques for pruning disk blocks of a clustered table in a relational database management system.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

In the context of database systems, a "dimension" is a list of values that provide categories for data. A dimension acts as an index for identifying values of a variable. For example, if sales data has a separate sales figure for each month, then the data has a MONTH dimension. That is, the data is organized by month. A dimension is similar to a key in a relational database. Data that is organized by two or more dimensions is referred to as "multidimensional data".

Any item of data within a multidimensional variable can be uniquely and completely selected by specifying one member for each of the variable's dimensions. For example, if a sales variable is dimensioned by MONTH, PRODUCT, and MARKET, specifying "January" for the MONTH dimension, "Stereos" for the PRODUCT dimension, and "Eastern Region" for the MARKET dimension uniquely specifies a single value for the variable. Thus, dimensions offer a concise and intuitive way of organizing and selecting data for retrieval, updating, and performing calculations.

Multidimensional data may be stored in relational database systems. When multidimensional data is stored in a relational database system, applications access the data by submitting commands that conform to the database language supported by the relational database system, the most common of which is the Structured Query Language (SQL).

Relational database systems store data in the form of related tables, where each table has one or more columns and zero or more rows. The conventional mechanism for storing multidimensional data in a relational database system is to store the data in tables arranged in what is referred to as a star schema. In relational database systems, a star schema is distinguished by the presence of one or more relatively large tables and several relatively smaller tables. Rather than duplicating the information contained in the smaller tables, the larger tables refer to rows in the smaller tables. Within a star schema, the larger tables are referred to as "fact tables", while the smaller tables are referred to as "dimension tables". FIG. 1 illustrates an exemplary star schema with two dimensions.

Referring to FIG. 1, it illustrates a database 100 that includes tables 102, 104, and 106. Table 102 is named "stores" and contains information about each of the stores in which sales may occur. Each row in the stores table 102 contains a unique store-id and information and the particular store that corresponds to the store-id. Table 104 is named "products" and contains information about each type of product that may be sold in any of the stores. Each row in the products table 104 contains a unique product-id and information about the particular product.

Table 106 is named "sales" and contains information about each sale in each of the stores represented in the stores table 102. Each row in the sales table 106 includes a dollar amount, a store-id to indicate the store at which the sale was made, a product-id to indicate the product sold in the sale, and the date of the sale. Typically, the number of sales will be vastly greater than both the number of stores at which the sales are made and the number of products carried by the stores. Detailed information about the store and product involved in a sale does not have to be stored in the rows of the sales table 106 because such detailed information is available in the stores table 102 and the products table 104, respectively. Instead, the rows of table 106 contain values (store-ids and product-ids) that reference information stored in the other tables 102 and 104. Therefore, tables 102, 104, and 106 constitute a star schema in which table 106 is a fact table and tables 102 and 104 are dimension tables.

The data stored in fact table 106 only has two dimensions, and fact table 106 has two columns (STORE-ID and PRODUCT-ID) dedicated to storing foreign key values for those dimensions. Typically, a fact table dedicates one column for storing foreign key values for each of the dimensions associated with the multidimensional data stored in the fact table. By storing foreign key values in the fact table that refer to rows in the dimension tables, the rows of the fact table can be kept to a relatively small size and the number of columns of the fact table can be kept to a relatively small number. For example, instead of the sales table 106 containing the values in the MANAGER, CITY, and STATE columns of the stores table 102 and the values in the SOURCE, PARTS, and COST columns of the products table 104, the sales table 106 contains foreign key values in two columns, one column referring to rows in the stores table 102 and the other column referring to rows in the products table 104. The number of rows in a typical fact table can be billions or more. In contrast, the number of rows in a dimension table is typically much lower (e.g., in the tens, hundreds, or thousands). Accordingly, a typical star schema is constructed to minimize the amount of data stored in each row of the fact table.

A query on multidimensional data may retrieve aggregates of fact table "measures" constrained by "dimension key values". For example, a query issued against the tables illustrated in FIG. 1 may retrieve the sum of all "amount" values from sales table 106 that occurred in San Jose. In this example, execution of the query involves joining rows from the sales table 106 with the rows, from stores table 102, where the "city" column has the value "San Jose".

This type of query is also referred to as a "star query". The "measures" of a fact table are the values in columns of the fact table that do not contain foreign key values. For example, the values in the AMOUNT and DATE columns of the sales tables 106 are the sale amount measures and the date of sale measures, respectively. The "dimension key values" are the values associated with a particular dimension. For example, the dimension key values for a "region" dimension may be "Northern Region", "Southern Region", "Eastern Region" and "Western Region".

In a star schema, the dimension key values of a dimension are typically stored in the dimension key column of the dimension table associated with the dimension. For example, the dimension key values of stores table 102 are stored in the "store-id" column of stores table 102. Similarly, the dimension key values of products table 104 are stored in the "product-id" column of products table 104.

Star queries often contain filter predicates on the dimension tables. The following is an example of a star query that joins the sales fact table 106 with qualified stores 102 and products 104 dimension tables. The stores dimension table 102 is qualified by the filter predicate st.state="CA" and the products dimension table 104 is qualified by the filter predicate pr.cost>10. The example star query requests the sum of sale amounts, by store city and product source, for the state of California, for products that cost more than $10.
SELECT st.city, pr.source, SUM(sa.amount)
FROM sales sa, stores st, products pr
WHERE sa.store-id=st.store-id AND sa.product-id=pr.product-id AND st.state="CA" AND pr.cost>10
GROUP BY st.city, pr.source One approach for improving performance of a star query in a relational database management system is to organize related data in the fact table in contiguous disk blocks on disk. A "disk block" is a logical unit of data storage used by a relational database management system for storing database data. A disk block has a block size (e.g., 4 KB) and may encompass one or more underlying file system or operating system blocks. Among other information, a disk block may include the data of one or more rows of a table or tables, or the data of a row may span multiple disk blocks.

In the context of storing multidimensional data in relational database management systems, the organization of related fact table data in contiguous disk blocks on disk is referred to as "clustering". Clustering can improve performance of star queries in relational database management systems by facilitating compression, indexing, and Input/Output (I/O) pruning. In the context of answering a star query in a relational database management system, I/O pruning refers to avoiding disk scans of certain disk blocks of the fact table that are known not to contain data relevant to the star query when scanning the fact table for data that is relative to the star query. Recent technological improvements in data storage devices have improved database access to the point that database systems sometimes perform table scans in lieu of indexed table access when executing a query, even where indexes are available. Consequently, techniques for clustering to facilitate I/O pruning have recently gained considerable attention in the industry.

There are a variety of different approaches to clustering a fact table in a relational database management system. In one approach, rows of the fact table are stored on-disk in a linear order based on the values in one or more columns of the rows of the fact table. For example, rows of the fact table can first be ordered by a query with an ORDER BY clause specifying one or more columns of the fact table, and then storing the rows in the sorted order on-disk in one or more contiguous disk blocks. In another approach, a fact table is clustered along multiple dimensions based on values in columns of the fact table according to a space filing curve such as a Z-order curve or a Hilbert space filing curve. In both approaches, the fact table is clustered based only on the columns of the fact table. These approaches facilitate I/O pruning when the fact table is clustered based on the columns of the fact table when the star query contains filter predicates on those columns.

Unfortunately, the performance bottleneck of executing a star query in relational database management systems is typically the join between the relatively large fact table and the dimension tables, referred to as a "star join". The dimension tables are often qualified in a star query by one or more, often highly selective, filter predicates on the dimension tables. In many cases, a star query does not contain any filter predicates on the columns of the fact table. For example, the example star query above contains the filter predicate st.state="CA" that qualifies the stores dimension table 102, and contains the filter predicate pr.cost>10 that qualifies the products dimension table 104, but does not contain any filter predicate on the AMOUNT column or the DATE column of the sales table 106.

A relational database management system that clusters a fact table based only on the columns of the fact table may perform wasteful disk scanning of the fact table when performing a star join. The disk scan may be wasteful because, in the absence of any filter on the fact table columns, the clustering of the fact table does not help, and all disk blocks of the fact table may need to be scanned. Specifically, even if the sales table 106 is clustered based on "date", the rows of the sales table 106 that join with the rows of stores table 102 where st.state="CA", and with the rows of products table 104 where pr.cost>10, may be randomly distributed within the sales table 106.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 1 is a block diagram that illustrates an example star schema;

FIG. 3 illustrates an example lineitem table;

FIG. 8 illustrates the table structure of a possible dimensional zonemap, according to an embodiment of the present invention;

DETAILED DESCRIPTION

Figure 2:
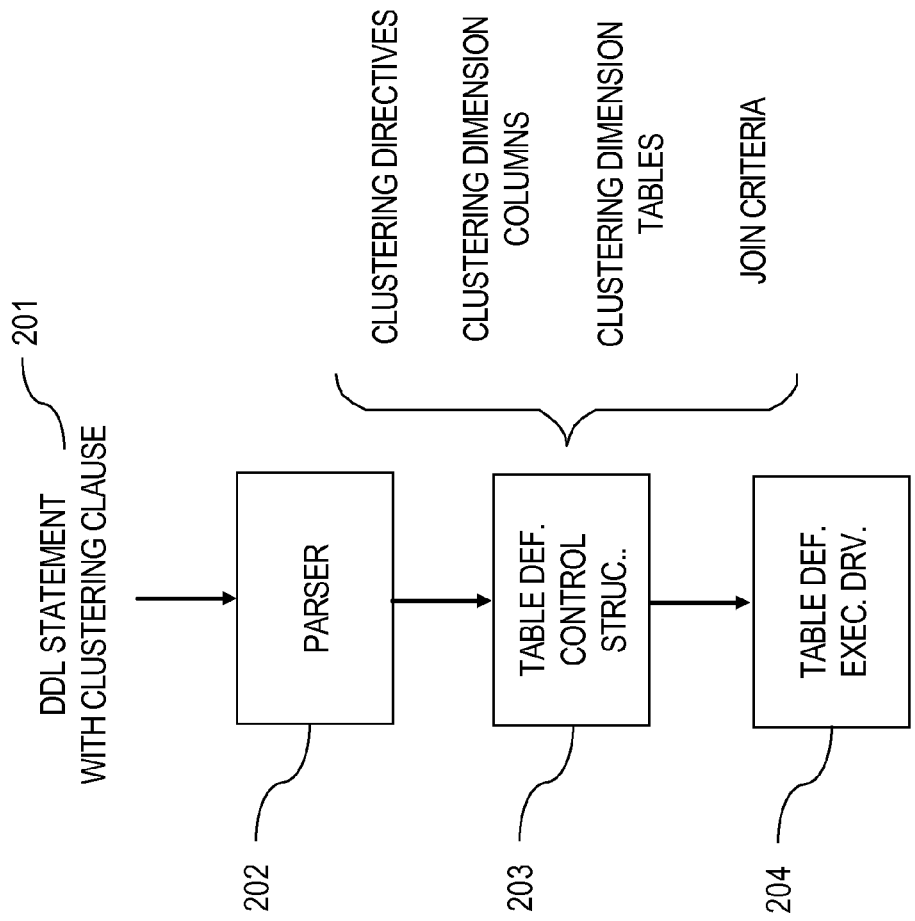
FIG. 2 is a block diagram of database server components for processing a DDL statement with a clustering clause, according to an embodiment of the present invention.

A method and apparatus for pruning disk blocks in a relational database management system is described. In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are provided that address the problems associated with prior approaches for clustering a fact table in a relational database management system. According to one aspect of the invention, a database server clusters a fact table in a database based on values from one or more columns of one or more dimension tables. More specifically, rows are stored in the fact table in a sorted order and the order in which the rows are sorted is based on values in one or more columns of one or more of the dimension tables. A user specifies the columns of the dimension tables on which the sorted order is based in "clustering criteria". The database server uses the clustering criteria to automatically store the rows in the fact table in the sorted order in response to certain user-initiated database operations on the fact-table.

For purposes of explanation, a column of the dimension tables specified in the clustering criteria and on which the sorted order is based is referred to herein as a "clustering dimension column". A dimension table of which a clustering dimension column is specified in the clustering criteria is referred to herein as a "clustering dimension table".

Various techniques are provided herein for storing rows in a fact table in a sorted order based on clustering dimension columns specified in clustering criteria. In general, the process involves the database server generating a "clustering" query that (a) selects a set of "source" fact table rows, (b) performs a join between the source fact table rows and the clustering dimension tables to produce a set of joined rows in which each row in the set of joined rows corresponds to at most one of the source fact table rows, (c) sorts the joined rows using values of the clustering dimension columns as sort keys, and (d) stores the source fact table rows in the fact table in the sorted order. Significantly, the values from the clustering dimension columns that were used as a basis for sorting the fact table rows are not stored in the fact table.

As explained in greater detail hereinafter, the source fact table rows may be selected from the fact table or from other sources (e.g., from an external table). The joined rows may be sorted in a linear order or in an interleaved order. An interleaved ordering may be based on a space-filling curve such as a Z-order space-filling curve or a Hilbert space-filling curve. Sorting the joined rows using values of the clustering dimension columns as sort keys causes source fact table rows that are conceptually related to each other to be stored physically near each other within the fact table. Because the conceptually related fact table rows are stored physically near each other based on values of the clustering dimension columns, I/O pruning during a disk scan of the fact table based on filter predicates on the clustering dimension columns is possible.

According to another aspect of the invention, an access structure is generated in the database that allows the database server to avoid scanning disk blocks of a fact table based on filter predicates in a query that qualify one or more dimension tables. This access structure is referred to hereinafter as a "dimensional zonemap". Generally, the dimensional zonemap generation process involves dividing the fact table into sets of contiguous disk blocks referred to hereinafter as "zones". For each zone, a minimum value and a maximum value for each of one or more "zoned" columns of the dimension tables is determined and maintained in the zonemap. For a query that contains a filter predicate on a zoned column, the predicate value can be compared to the minimum value and maximum value, for that zoned column, maintained for a zone to determine whether the zone contains any fact table rows that satisfy the filter predicate. Because the minimum and maximum values maintained for the zones are determined based on values of columns of the dimension tables, I/O pruning is possible during a disk scan of the fact table based on filter predicates that qualify the dimension columns.

Clustering Criteria

As mentioned above, star queries often qualify dimension tables with filter predicates on the dimension tables. For example, in the following example star query, the countries dimension table is qualified with two filter predicates, one on the region column of the countries dimension table and the other on the subregion column of the countries dimension table.

SELECT countries.region, countries.subregion, countries.name, sum(sales.amount_sold)
FROM sales JOIN countries ON sales.country_id=countries.country_id
WHERE countries.region='Europe' AND countries.subregion='Eastern Europe'
GROUP BY countries.region, countries.subregion, countries.name Also as mentioned previously, the performance bottleneck executing a star query is likely to be the join between the fact table and the dimension tables. Where the filter predicates in a star query qualify the dimension tables, it would be beneficial to reduce, through I/O pruning, the number of rows of the fact table that are involved in the star join. To facilitate such I/O pruning, a user causes conceptually related fact table rows to be physically stored near each other within the fact table, where "conceptually related" can be based on values in one or more columns of one or more dimension tables.

As well as facilitating I/O pruning, physically storing conceptually related fact table rows near each other within the fact table also facilitates data compression of the fact table and indexing of the fact table. Storing conceptually related fact table rows near each other within the fact table may result in the values in the one or more columns of the fact table rows to be similar to each other thereby resulting in better compression of such column values. For example, if the values in a column of the fact table rows are stored on disk in a sorted order, then a run length encoding compression algorithm can be highly effective in compressing the data in such a column. Creation of an index on one or more clustering columns of the fact table facilitates improved performance of accessing the fact table data via such an index. The reason for improved accessibility of the fact table data is due to the physical proximity on disk of the fact table rows having the same index key values. For example, because of the clustering of the fact table, if all fact rows with a particular index key value are stored together in a disk block (or a set of disk blocks), then the retrieval of such fact rows via the index can incur a reduced amount of disk I/O.

In certain embodiments described herein, techniques are providing for clustering a fact table based on values in one or more columns of one or more dimension tables. However, it should be appreciated that the techniques may also be applied to cluster a fact table based on values in one or more columns of one or more dimension tables and values in one or more columns of the fact table or to cluster a fact table based only on values in one or more columns of the fact table.

DDL Interface for Clustering Criteria

According to one aspect of the present invention, a data definition language (DDL) interface is provided by which a user can specify clustering criteria to associate with a fact table. The clustering criteria may be stored in the database as metadata of the fact table. As described in greater detail below, the clustering criteria are read from the database when generating a clustering query to cluster the fact table.

In one embodiment, an additional "clustering" clause is added to a DDL statement that defines the fact table. Such a DDL statement may be used in the context of creating the fact table, altering its definition, or any other DDL action that defines, changes, or modifies the columns or constraints of the fact table. Thus, the user may conveniently associate clustering criteria with a fact table when defining the fact table. For example, the following exemplary DDL statement, to create the sales table, includes a clustering clause designated by the keyword "CLUSTERING":

```
CREATE TABLE sales
(
    countries_id number not null, ....
    amount_sold number(10,2)
)
CLUSTERING
    sales JOIN countries ON (sales.country_id = countries.country_id)
    BY LINEAR ORDER (countries.region, countries.subregion,
    countries.name)
```

In this description, examples of user-specified clustering criteria are provided in the form of example SQL statements. It should be understood that the syntax of the example SQL statements is merely exemplary. The present invention is not limited to the syntax of the examples and other syntaxes for conveying the same clustering criteria semantics may be used.

Clustering Criteria—Clustering Dimension Columns and Join Criteria

The clustering criteria are used to specify a number of different clustering options for clustering a fact table based on values in one or more dimension tables. In one embodiment, the clustering criteria specify one or more clustering dimension columns and join criteria. The one or more clustering dimension columns are the columns of the dimension tables by which the user wishes to sort rows of the fact table, either by a linear ordering or by an interleaved ordering. The clustering dimension columns are typically the columns of the dimension tables that the user expects star queries to contain filter predicates on.

In the examples herein, the clustering dimension columns are specified in a sub-clause of the clustering clause as parameters to a sorting method directive. Sorting method directives are described in greater detail below. For example, in the clustering clause above, the clustering dimension columns countries.region, countries.subregion, and countries.name are specified as parameters to the sorting method directive BY LINEAR ORDER. However, other manners of specifying the columns of the dimension tables by which the user wishes to sort rows of the fact table may be used and the present invention is not limited to the manners of the examples. For example, clustering dimension columns may be specified by the user in clustering criteria without any sorting method directive where a default sorting method directive is implied.

The join criteria specifies foreign key columns of the fact table and unique key columns in the clustering dimension tables by which the user wishes to join the fact table with the clustering dimension tables. For example, the clustering clause in the above example DDL statement specifies the clustering dimension columns countries.region, countries.subregion, and countries.name and specifies join criteria for equi-joining the sales fact table with the countries clustering dimension table using the country_id foreign key column of the sales table and the country_id unique key column of the countries table. An equi-join is a specific type of join in which only equality comparison operators (e.g., "=") are used in the join predicates and range comparison operator (e.g., ">", "<") are not used. The join criteria are used to formulate the clustering query as described in greater detail below. Because only unique key columns in the clustering dimension tables are specified in the join criteria, a row from the fact table will be joined by the clustering query with at most one row from each of the clustering dimension tables and a row from the fact table will correspond to at most one row in the set of joined rows formed by the clustering query.

The clustering criteria can be used to specify clustering options for clustering a fact table based on more than one dimension, where each dimension corresponds to a different dimension table. In this case, join criteria are provided by the user for joining the fact table with each of the different dimension tables as in the following example clustering clause which specifies the clustering dimension columns promotions.subcategory and products.subcategory and also specifies join criteria for joining the sales fact table with the promotions clustering dimension table using the promo_id foreign key column of the sales table and the promo_id unique key column of the promotions table. The clustering clause also specifies join criteria for joining the sales fact table with the products clustering dimension table using the prod_id foreign key column of the sales table and the prod_id unique key column of the products table.

```
CREATE TABLE sales
(
    prod_id not null number.
    promo_id not null number, ....
    amount_sold number(10,2)
)
CLUSTERING
    sales JOIN promotions ON (sales.promo_id = promotions.promo_id)
    JOIN products ON (sales.prod_id = products.prod_id)
    BY INTERLEAVED ORDER (promotions.subcategory,
    products.subcategory)
```

Clustering Criteria—Sorting Method

According to an embodiment of the present invention, the clustering criteria specify the type of sorting to perform on the set of joined rows formed by the clustering query. The type of sorting performed by the clustering query determines how a set of source fact table rows selected by the clustering query is clustered within the fact table. How a set of source fact table rows are clustered within the fact table determines the I/O efficiencies that can be realized through I/O pruning based on filter predicates in a query. In general, the type of sorting is one of two general types: linear or interleaved. In both cases, the sorting may be based on the clustering dimension columns.

Clustering Criteria—Linear Sorting Method

With linear ordering, the joined rows formed by the clustering query are sorted in ascending or descending order based on the values of the clustering dimension columns in the joined rows. If more than one clustering dimension column is specified in the clustering criteria, then the sequence of the multiple clustering dimension columns as specified by the user in the clustering criteria defines the organization of the sorted joined rows. That is, the joined rows are first sorted by the first clustering dimension column in the sequence, then that set of ordered joined rows is sorted by the second clustering dimension columns in the sequence, and so on. The source fact table rows are then stored within the fact table in the sorted linear order in contiguous disk blocks.

A linear sorting may be designated in a clustering clause in which the sequence of clustering dimension columns is specified as a parameter of the linear sorting ordering designation. As an example of a clustering clause specifying a linear sort order, the clustering clause in the following DDL statement to create a sales table specifies that the set of joined rows formed by the clustering query are to be sorted first based on the values in the countries.region column of the joined rows, then that set of ordered joined rows is to be sorted based on the values in the countries.subregion column, and then that set of ordered joined rows is to be sorted by the values in the countries.name column.

```
CREATE TABLE sales
(
    countries_id number not null, ....
    amount_sold number(10,2)
)
CLUSTERING
    sales JOIN countries ON (sales.country_id = countries.country_id)
    BY LINEAR ORDER
    (countries.region, countries.subregion, countries.name)
```

With a linear sort order, the greatest I/O pruning benefits can be realized when a star query contains filter predicates on a prefix of the sequence of clustering dimension columns specified in the clustering criteria, for example, if a star query contains a filter predicate on the countries.region column. However, limited or no I/O pruning benefits can be realized with a linear ordering when a star query contains filter predicates only on a suffix of the clustering dimension columns or does not contain any filter predicates on the clustering dimension columns. Consequently, a linear sort order will typically be used only when most of the star queries contain filter predicates on a prefix of the sequence of clustering dimension columns or when a benefit of clustering other than I/O pruning, such as data compression (e.g., through run-length encoding), is desired. If greater I/O pruning flexibility is needed, the user can select an interleaved sorting method in the clustering criteria.

Clustering Criteria—Interleaved Sorting Method

With an interleaved sorting method, I/O pruning on the fact table can be performed on a filter predicate in a query independently of other filter predicates in the query. In particular, I/O pruning can be performed on a filter predicate on a clustering dimension column in a query regardless of the position of that clustering dimension column in the clustering criteria. For example, with the following clustering criteria that specifies an interleaved sort ordering, I/O pruning on the sales table can be performed on one or more of the promotions.subcategory and the products.subcategory columns independently of each other.

```
CREATE TABLE sales
(
    prod_id not null number.
    promo_id not null number, ....
    amount_sold number(10,2)
)
CLUSTERING
    sales JOIN promotions ON
    (sales.promo_id = promotions.promo_id)
    JOIN products ON (sales.prod_id = products.prod_id)
    BY INTERLEAVED ORDER
    (promotions.subcategory, products.subcategory)
```

A variety of different approaches may be used to achieve an interleaved ordering of rows stored in the fact table. In general, the approaches involve use of a space-filling curve such as a Z-order curve or a Hilbert space-filling curve that have the property that points which are close to each other in a finite n-dimensional space are mapped to single-dimensional values which are also in proximity to each other. Conceptually, the n-dimensional space is divided into an n-dimensional "cube" of cells. By convention, the division of the n-dimensional space is referred to as "cube" even though the number of dimensions n can be two or more than three. Each cell of the cube is assigned a range of values, one range of values for each of the n-dimensions. The number of dimensions n equals the number of clustering dimension columns specified in the clustering criteria.

For a set of source fact table rows to be stored within a fact table in an interleaved order, each source fact table row in the set is mapped to a cell in the cube based on the values of the clustering dimension columns in the joined row formed by the clustering query corresponding to the source fact table row and the ranges of values assigned to the cells. More than one source fact table row may be mapped to a cell in the cube. Some cells in the cube may not have any source fact table rows mapped to them. The space-filing curve imposes a linear ordering the cells. Source fact table rows assigned to the cells are stored within the fact table in the linear order imposed by the space-filing curve with the effect that conceptually related rows that are close to each other in the n-dimensional cube are also close to each other within the fact table.

In the above example, a default space-filing curve is implied by the directive BY INTERLEAVED ORDER. The default space-filing curve can be any one of a number of known space-filing curves such as a Z-order space-filing curve or a Hilbert space-filing curve. Alternatively, the specific space-filing curve to use may be explicitly specified in the clustering criteria. For example, instead of BY INTERLEAVED ORDER, BY HILBERT ORDER or BY Z ORDER may be specified instead.

Further information on the use of Z-Order space-filing curves for multidimensional clustering may be found in Morton, G. M, *A Computer Oriented Geodetic Data Base and A New Technique in File Sequencing*, International Business Machines Company, 1966. Further information on the use of Hilbert space-filing curves for multidimensional clustering may be found in Chapter 14 of Warren, Henry S., *Hacker's Delight*, Addison-Wesley Professional, 2003.

Clustering Criteria—when to Cluster

According to one embodiment of the present invention, clustering criteria specifies when clustering of a fact table is to be performed. In particular, the user may specify what actions trigger clustering of the fact table. In general, there are two types of actions that can trigger clustering of the fact table. One type is action is loading data into the fact table. With this type, the data added to the fact table is clustered according to clustering criteria associated with the fact table. The other type of action is moving data from one storage location of the fact table to another storage location. The moved data is clustered according to clustering criteria associated with the fact table.

An example of the data loading type of action that can trigger clustering of the fact table is the submission of a data modeling language (DML) statement to add rows to the fact table. The INSERT statement is an example of a DML statement for adding rows to a table. For example, clustering a sales fact table may be triggered upon submission of the following INSERT statement:
INSERT INTO sales SELECT promo_id, prod_id, . . . amount_sold FROM sales_external In response to receiving the above INSERT statement, the rows selected from the sales_external table by the SELECT sub-clause will be the source fact table rows selected and stored within the sales fact table in a sorted order by the automatically generated clustering query.

An example of the data movement type of action that can trigger clustering of the fact table is partition maintenance operations on the fact table. Very generally, a partition is strict subset of all rows of a table that share the same column and constraint definitions with the other rows of the table but can have different physical attributes from the other rows. For example, two partitions of a table can be stored on separate storage devices. Partition maintenance operations that can trigger clustering of a fact table include moving a partition of the fact table to from one data storage location to another. When moving a partition of a fact table triggers clustering, the source fact table rows are all of the rows of the partition to be moved.

Another example of the data movement type of action that can trigger clustering of the fact table is an on-line redefinition of the fact table. On-line redefinition of a "source" table generally involves defining and creating an interim table and copying the data of the source table into the interim table while allowing the source table to be accessible to read and write operations during the copy. The interim table may be defined with a new structure relative to the source table. For example, the interim table may remove columns, add columns, or rename columns from the source table. Further, data copied from the source table to the interim table may be transformed. Updates to the source table made while the data is being copied to the interim table are stored in a log. During the copy, the data in the log may be synchronized with the interim table. Once the copying is finished, the source table and interim table are briefly locked for exclusive access to synchronize any remaining changes in the log with the interim table and to finalize the redefinition. After the redefinition is finalized, the interim table is the "new" source table and the "old" source table may be dropped.

For purposes of clustering during on-line redefinition of a fact table, the source fact table rows selected by the clustering query are the rows of the source table. The clustering criteria associated with the source table are used to sort the rows of the source table when copying the source table to the interim table. The sorted rows of the source table are stored within the interim table in the sorted order. The sorted rows of the source table may also undergo any data transformations defined by the on-line redefinition. Rows stored in the interim table may also be clustered when the source table log is synchronized with the interim table during copying. As when copying rows of the source table to the interim table, when rows in the source table log are synchronized with the interim table, the clustering criteria associated with the source table is used to cluster the rows of the source table log within the interim table.

When clustering occurs on a fact table may be specified by a user in a clustering clause. For example, the clustering clause in the following DDL statement to create a sales table specified that clustering should occur on data loading actions (e.g., when rows are inserted into the sales table) and on data movement actions (e.g., when the sales table is partitioned or when the sales table is redefined on-line).

```
CREATE TABLE sales
(
    prod_id not null number.
    promo_id not null number, ....
    amount_sold number(10,2)
)
CLUSTERING
    sales JOIN promotions ON
    (sales.promo_id = promotions.promo_id)
    sales JOIN products ON (sales.prod_id = products.prod_id)
    BY INTERLEAVED ORDER
    (promotions.subcategory, products.subcategory)
    YES ON LOAD YES ON DATA MOVEMENT
```

Here, the keyword sequence "YES ON LOAD" is used to indicate that clustering of the sales table should occur on data loading actions. The keyword sequence "YES ON DATA MOVEMENT" is used to indicate that clustering of the sales table should also occur on data movement actions. If, by default, clustering is performed on data loading actions and data movement actions then the keywords sequences "NO ON LOAD" and/or "NO ON DATA MOVEMENT" can be used to selectively disable default clustering options. Of course, other syntaxes may be used to convey the same semantics.

Processing a Clustering Clause in a DDL Statement

As mentioned above, a DDL statement to define a fact table may contain a clustering clause specifying clustering criteria. For example, the following DDL statement contains a clustering clause to add clustering criteria to a sales table.

```
ALTER TABLE sales ADD CLUSTERING
    sales JOIN promotions ON
    (sales.promo_id = promotions.promo_id)
    JOIN products ON (sales.prod_id = products.prod_id)
    BY INTERLEAVED ORDER
    (promotions.subcategory, products.subcategory)
    YES ON LOAD YES ON DATA MOVEMENT
```

Components of a database server for processing a clustering clause in a DDL statement are illustrated in FIG. 2. Initially, a DDL statement 201 defining a fact table and with a clustering clause is received. The statement 201 may be received from a variety of different sources. For example, the statement 201 may be received from a user through a command line or graphical user interface. Alternatively, the statement 201 may be received from another computing process, for example, a remote computing process that sends the statement 201 over a network to the database server. These are just some examples of possible sources of the statement 201 and the present invention is not limited to any particular source from which the statement 201 can be received.

Upon receiving the statement 201, the statement 201 is provided to a parsing routine 202. The parsing routine 202 parses the statement 201 to produce a table definition control structure 203. Among other possible information in the table definition control structure 203, the structure 203 specifies one or more elements of the clustering clause in the DDL statement 201. These elements of the structure 203 may include any clustering directives such as whether clustering of the fact table is to occur on data loading actions, on data movement actions, or on both data loading and data movement actions. The elements of the structure 203 may also include the one or more clustering dimension columns, the one or more clustering dimension tables, and the join criteria specified in the clustering clause.

A table definition execution driver 204 uses the structure 203 to validate the clustering clause and to create table metadata in the database for the defined table representing the clustering criteria. For validation, the driver 204 validates the existence of the clustering dimension columns and the clustering dimension tables. If one of the clustering dimension tables or one of the clustering dimension columns does not exist in the database, then the driver 204 may reject the statement 201 with an error. The driver 204 also validates the join criteria. The validation of the join criteria includes performing foreign key validation on the foreign key columns of the fact table that refer to the clustering dimension tables. At least part of the foreign key validation includes the driver 204 verifying that all join columns of the clustering dimension tables referred to in the join criteria have unique key constraints and that the joins specified by the join criteria are all equi-joins. This validation is done to ensure that, when the clustering query joins the source fact table rows with the clustering dimension tables based on the join criteria, no source fact table rows are duplicated in the set of joined rows. If the driver 204 determines that one of the join columns of the clustering dimension columns does not have a unique key constraint, the driver 204 may reject the statement 201 with an error.

Assuming there are no errors with the statement 201, once validated, the driver 204 stores metadata in the database representing the clustering criteria. For example, the driver 204 may store the metadata in data dictionary tables of the database or in another repository of information about database data.

A Function for Interleaved Sorting

According to one embodiment of the present invention, a function is provided for use within clustering queries to store rows within a fact table in an interleaved order. The function accepts between one to four arguments (expressions) and returns a raw string as output.
raw_string=ORA_CLUSTERING(expr1[, expr2, expr3, expr4])

The function ORA_CLUSTERING treats the arguments as binary data and evaluates a space-filing curve on the binary arguments (e.g., a Hilbert space-filing curve or a Z-order function). The evaluation is based on a bit mixing of the binary representations of the arguments. In particular, the first bit is taken from each of the arguments, then the second bit is taken from each of the arguments, then the third bit is taken from each of the arguments, and so on, to create a bit string as a result. So that consistent weight is given to each argument, the arguments may be padded to their maximum lengths with a padding value (e.g., byte value 0x00). The size of the returned raw string will then be the sum of the lengths of the arguments as padded. Arguments to the function may be truncated to a maximum allowed number of bytes (e.g., 1000) for efficiency.

Clustering a Fact Table on Load

As mentioned previously, clustering criteria associated with a fact table may specify that clustering is to be performed on rows loaded into the fact table. A typical way rows are loaded into a table is with an INSERT DML statement containing a SELECT sub-query. For example, the following INSERT statement appends rows to a sales table based on rows selected from a sales_external table.
INSERT/*+APPEND*/INTO sales SELECT promo_id, prod_id, . . . amount_sold FROM sales_external.

According to one embodiment of the present invention, a DML statement to load rows into a table associated with clustering criteria is automatically converted to a clustering query. The clustering query is executed instead of the original DML statement to load the rows into the table associated with the clustering criteria in a sorted order. The clustering query is generated to include the select sub-query of the original DML statement that selects the source fact table rows, the join criteria of the clustering criteria, and an ORDER BY clause to sort the source fact table rows by the clustering dimension columns and in the sort order designated by the clustering criteria (e.g., linear or interleaved sort order). The join criteria may be converted as necessary so that the joins between the fact table and the dimension tables are left outer joins, with the fact table being the left hand table, so that none of the source fact table rows are missing from the set of joined rows formed by the clustering query.

As an example, consider the clustering criteria specified in the following DDL statement to create a sales table.

```
CREATE TABLE sales
(
    prod_id not null number,
    promo_id not null number, ...
    amount_sold number (10, 2)
)
CLUSTERING
    JOIN promotions ON (sales.promo_id = promotions.promo_id)
    JOIN products ON (sales.prod_id = products.prod_id)
    BY LINEAR ORDER
    (promotions.subcategory, products.subcategory)
    YES ON LOAD
```

Here, source fact table rows are to be clustered in the sales fact table a linear order based on the subcategory column of the promotions dimension table and the subcategory column of the products dimension table.

Now assume the following DML statement to load rows into the sales fact table is submitted to the database server. INSERT INTO sales SELECT promo_id, prod_id, . . . amount_sold FROM sales external Upon receiving this DML statement, the database server may automatically convert the DML statement into the following clustering query.

```
INSERT INTO sales
    SELECT promo_id, prod_id, ... amount_sold
    FROM sales_external
        LEFT OUTER JOIN promotions ON
        (sales.promo_id = promotions.promo_id)
        LEFT OUTER JOIN products ON
        (sales.prod_id = products.prod_id)
        ORDER BY promotions.subcategory, products.subcategory
```

In this example clustering query, the select sub-query of the original DML statement is included. Thus, the clustering query will select the same set of source fact table rows that the original DML statement would have selected. The join criteria have been converted to force left outer joins between the sales fact table and the promotions and products dimension tables. An order by clause is added to sort the source fact table rows in a linear order by values of the promotions.subcategory and products.subcategory columns in accordance with the BY LINEAR ORDER sorting directive in the clustering criteria.

As discussed, the source fact table rows can be sorted in a linear order or an interleaved order based on a space-filing curve. To do so, the database server may generate a clustering query that invokes the CLUSTERING function in the ORDER BY clause of the clustering query. For example, assume that instead of the clustering criteria above specifying BY LINEAR ORDER, it instead specified BY INTERLEAVED ORDER, then the database server may automatically convert the DML statement into the following clustering query.

```
INSERT INTO sales
    SELECT promo_id, prod_id, ... amount_sold FROM sales_external
        LEFT OUTER JOIN promotions ON
        (sales.promo_id = promotions.promo_id)
        LEFT OUTER JOIN products ON
        (sales.prod_id = products.prod_id)
        ORDER BY ORA_CLUSTERING
        (promotions.subcategory, products.subcategory)
```

This clustering query is similar to the clustering query generated when BY LINEAR ORDER is specified in the clustering criteria. The difference in this clustering query is that the ORA_CLUSTERING function is invoked in the ORDER BY clause to achieve an interleaved sorting order of the source fact table rows.

Zonemaps

According to an embodiment of the present invention, I/O pruning during table scans is facilitated in a database server through the use of zonemaps. Generally, a zonemap is a database access structure that allows a database server to skip a disk scan of certain disk blocks of a table when scanning the table because it is known, based on the zonemap, that the skipped disk blocks cannot contain data relevant to the query for which the table scanning is being performed.

At a high level, generating a zonemap for a table involves dividing the disk blocks of the table into sets of contiguous disk blocks called "zones". For each zone, the minimum and maximum values of interesting columns are determined. According to an embodiment of the present invention, the interesting columns can be columns of the table for which the zonemap is being generated (e.g., columns of a fact table) or columns of other tables (e.g., columns of dimension tables). A table for which a zonemap is being generated is referred to hereinafter as a "zoned table". The "interesting" columns that a zonemap maintains minimum and maximum values for are referred to hereinafter as the "zoned columns" of the zonemap. According to an embodiment of the present invention, the zoned columns of a zonemap do not have to be (but can be) columns of the zoned table.

When the database server executes a query that qualifies one of the zoned columns C with a filter predicate having a constant predicate value V, the database server can compare the value V to the minimum value and the maximum value of the column C determined for a zone to determine whether the zone can possibly contain data satisfying the filter predicate. If the zone cannot possibility satisfy any filter predicate of the query, then the disk blocks of the zone may be skipped during a table scan of the zoned table.

The filter predicate can be a relational predicate of the form "zoned column C <predicate operator> constant V", where <predicate operator> is the equality operator (e.g., "="), the less than or equal to operator (e.g., "<="), the less than operator (e.g., "<"), the greater than operator (e.g., ">"), the greater than or equal to operator (e.g., ">="), or the not equal to operator (e.g., "<>"). Where the predicate operator is the equality operator, a zone cannot possibility satisfy the filter predicate if the predicate value V is both less than the minimum value of the column C for the zone and greater than the maximum value of the column C for the zone. Where the predicate operator is the less than operator, the zone cannot possibility satisfy the filter predicate if the predicate value V is less than or equal to the minimum value of the column C for the zone. Where the predicate operator is the less than or equal to operator, the zone cannot possibility satisfy the filter predicate if the predicate value V is less than the minimum value of the column C for the zone. Where the predicate operator is the greater than operator, the zone cannot possibility satisfy the filter predicate if the predicate value V is greater than or equal to the maximum value of the column C for the zone. Where the predicate operator is the greater than or equal to operator, the zone cannot possibility satisfy the filter predicate if the predicate value V is greater than the maximum value of the column C for the zone. Where the predicate operator is the not equal to operator, the zone cannot possibility satisfy the filter predicate if the minimum value and the maximum value of the column C for the zone are equal and the predicate value V equals the minimum and maximum values.

Alternatively, the filter predicate can contain an IN list that specifies a list of alternative constant values, for example, "where countries.region IN ('Western Europe', 'Eastern Europe')". Where the filter predicate contains an IN list, a zone cannot possibility satisfy the filter predicate if each predicate value V in the IN list is both less than the minimum value of the column C for the zone and greater than the maximum value of the column C for the zone.

As yet another alternative, the filter predicate can contain a LIKE operator with a constant character string value or a constant character string value that prefixes a wildcard operator, for example, "countries.region LIKE 'Western %'"). Where the filter predicate contains a LIKE operator with a constant character string value or a constant character string value that prefixes a wildcard operator, a zone cannot possibility satisfy the filter predicate if the upper bound on the range of character string values covered by the LIKE operator is less than the minimum value of the column C for the zone or if the lower bound on the range of character string values covered by the LIKE operator is greater than the maximum value of the column C for the zone. For example, a zone cannot possibility satisfy the "countries.region LIKE 'Western %') filter predicate if the upper bound string "Westero" is less than the minimum value of the column C for the zone or if the lower bound string "Western" is greater than the maximum value of the column C for the zone.

A Zonemap Example

As an example of using a zonemap to facilitate I/O pruning in a database server, consider the database table 300 of FIG. 3. The table 300 has five columns named order_key, ship_date, receipt_date, destination, and quantity. The table 300 has eight rows labeled 301-308 in FIG. 3. A practical embodiment may have many more rows numbering in the millions, billions, or more.

Figure 4:
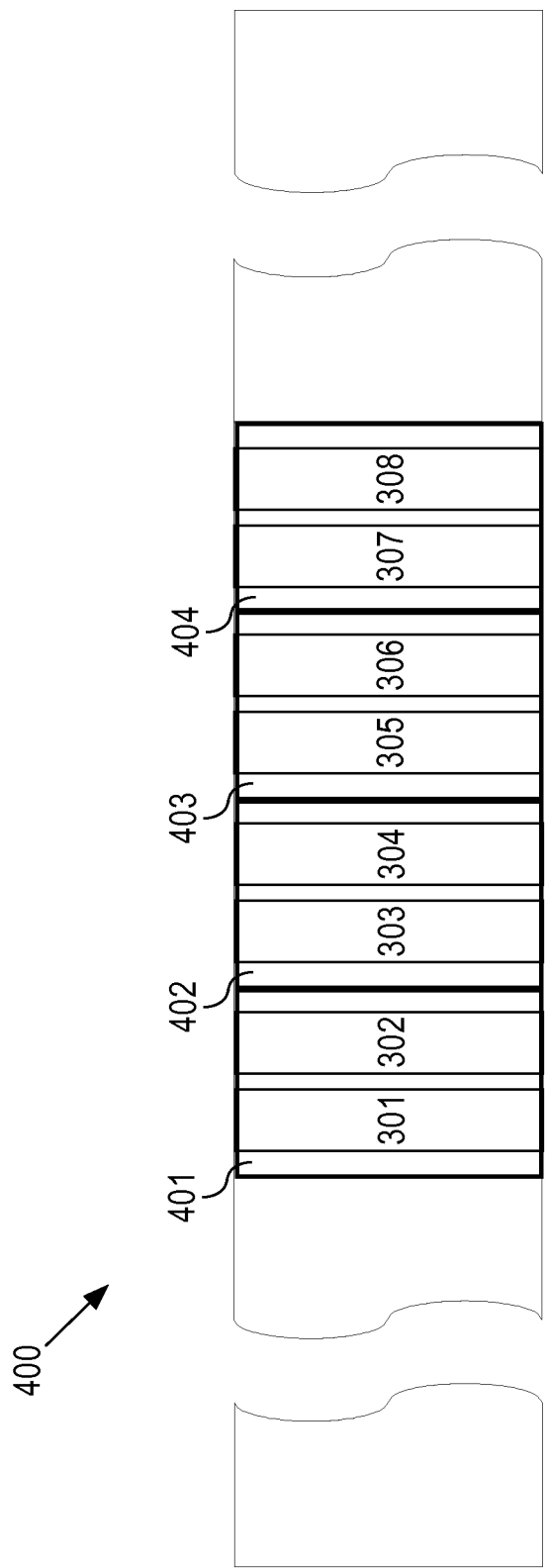
FIG. 4 is a block diagram of a portion of a disk containing disk blocks.

Referring now to FIG. 4, it illustrates how the rows 301-308 of table 300 may be stored on a portion of a disk 400 in a sorted order in disk blocks 401-404. The disk portion 400 may corresponds to an extent, a segment, a tablespace, or other logical portion of a disk. The disk portion 400 is viewed logically by the database server as a set of separately addressable disk blocks arranged in a linear order. The disk blocks of the disk portion 400 are numbered consecutively according to their linear order by the database server. When rows of a table are stored in a sorted order (e.g., a linear order or an interleaved order) in contiguous disk blocks (e.g., rows 301-308 of table 300 stored in disk blocks 401-404), the rows are said to be "clustered" within the table. More generally, the table is said to be a "clustered" table.

In this example, rows 301-308 of table 300 are stored in a linear sort order based on the values of the ship_date column. In particular, rows 301 and 302 are stored in disk block 401, rows 303 and 304 are stored in disk block 402, rows 305 and 306 are stored in disk block 403, and rows 307 and 308 are stored in disk block 404. A practical embodiment may have more or less rows per disk block and/or have a different number of rows per disk block or have disk blocks within the table that contain different numbers of disk blocks. Further, the rows of a table may be stored in many more disk blocks numbering in the tens, hundreds, thousands, millions, or more. Further still, a disk block may store rows from more than one table.

Continuing the illustration of the use of zonemaps for I/O pruning, a zonemap for table 300 may be constructed in which each zone consists of two disk blocks. The maximum number of disk blocks per zone of a zonemap is referred to herein as the "zonemap scale" of the zonemap. In one embodiment, the zonemap scale of a zonemap is user-configurable. Generally, a chosen zonemap scale is a tradeoff between minimizing the number of zones of the zonemap, where the zonemap scale is relatively large, and maximizing I/O pruning efficiency, where the zonemap scale is relatively small.

In one embodiment, the user specifies a zonemap scaling factor S as an integer value greater than zero. The database server then computes the zonemap scale as $2^S$ (i.e., two to the power of S, where S>0). For example, if the zonemap scaling factor for a zonemap is 10, then the zonemap scale of the zonemap is 1024 disk blocks. Other manners of specifying a zonemap scaling factor and calculating the zonemap scale are possible and the present invention in not limited to any particular manner. Further, a default zonemap scale for a zonemap may be calculated by the database server based on a variety of factors including the number of rows of the zoned table, the number of disk blocks of the zoned table, and the disk block size.

Figure 5:
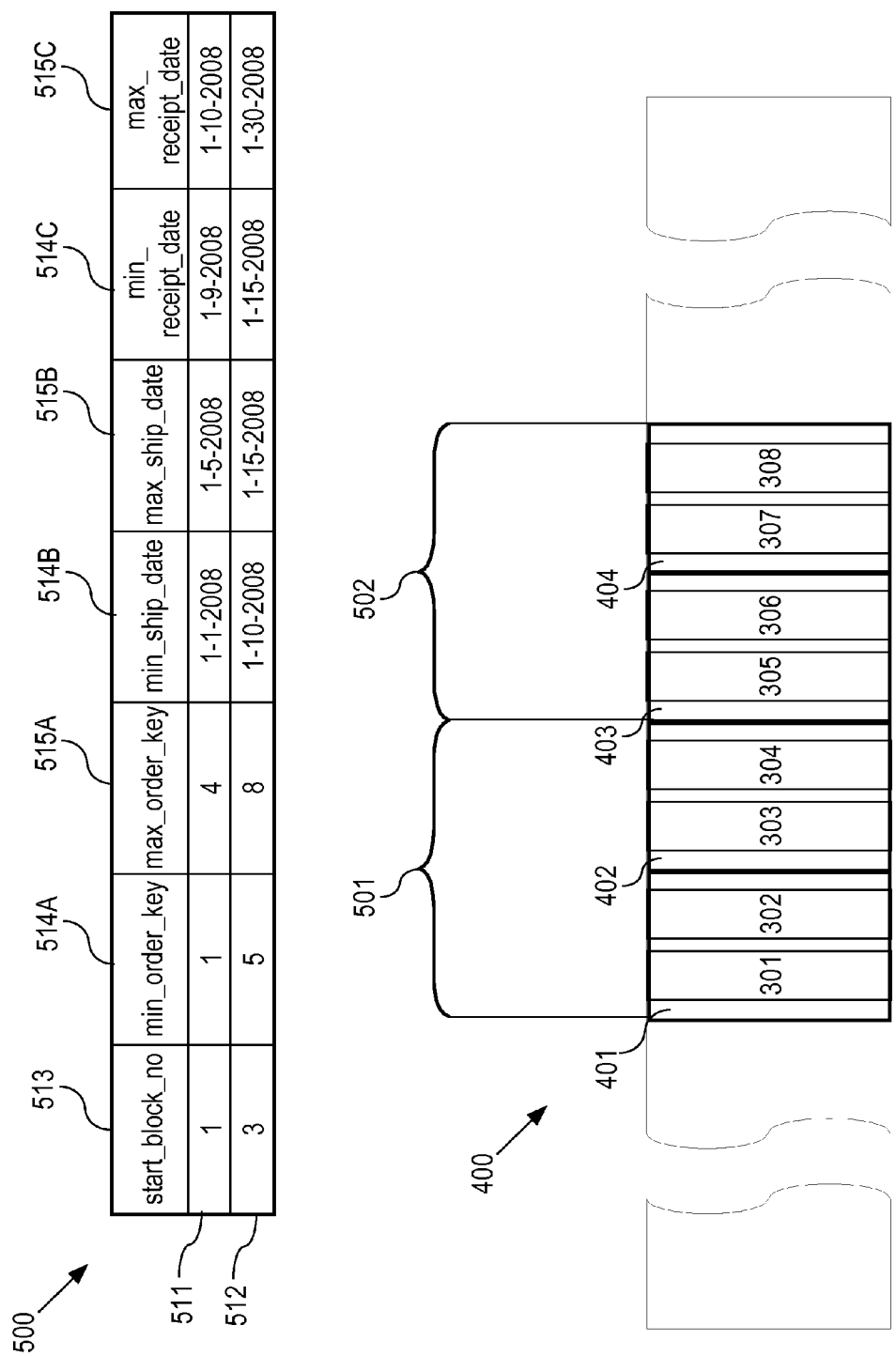
FIG. 5 illustrates an example zonemap table and contains the block diagram of FIG. 4 with disk blocks grouped into zones, according to an embodiment of the present invention.

Returning to the example, FIG. 5 illustrates a zonemap 500 on table 300. The zonemap 500 may be represented as a table and may be stored in a database as such. In this example, the zonemap scaling factor is 1 and the zonemap scale is $2^1$ or 2. Consequently, the four disk blocks 401-404 of FIG. 4 are divided in two zones 501 and 502 as shown in FIG. 5. Each zone 501 and 502 contains two contiguous disk blocks. In particular, zone 501 contains contiguous disk blocks 401 and 402 and zone 502 contains contiguous disk blocks 403 and 404.

Each row 511 and 512 of zonemap 500 corresponds to a zone 501 and 502 of the zonemap. In particular, row 511 corresponds to zone 501 and row 512 corresponds to zone 502. The zonemap 500 includes a zone disk block range column 513 specifying, for each zone, the first block in the set of contiguous disk blocks covered by the zone. More generally, the column 513 indicates or specifies the range of contiguous disk blocks covered by a zone, for each zone of the zonemap 500. For example, assuming disk blocks 401-404 are consecutively numbered by the database server 1, 2, 3, and 4 respectively, the values in the column 513 indicate that zone 501 covers contiguous disk blocks 401 and 402 and that zone 502 covers contiguous disk blocks 403 and 404. The columns of the zonemap 500 also include a minimum value column 514 and a maximum value column 515 for each zoned columns on which the zonemap 500 is constructed.

Based on zonemap 500 and given the following query with a filter predicate on the ship_date column, a database server performing a full table scan of table 300 can skip a scan of disk blocks 3 and 4 because those disk blocks, based on the minimum and maximum values stored in columns 514B and 515B in row 512 of the zonemap 500, cannot contain rows relevant to the query. Instead, only a scan of disk blocks 1 and 2 is needed.
SELECT*FROM lineitem WHERE ship_date='01-01-2008'

Dimensional Zonemaps

A "dimensional zonemap" is a zonemap of a clustered fact table based on at least one column of a dimension table. A dimensional zonemap of a fact table facilitates I/O pruning of the fact table based on filter predicates in a query on columns of the dimension tables. According to one embodiment, a dimensional zonemap is created by a "dimensional zonemap query". The dimensional zonemap query creates a zonemap in the database in the form of a materialized view. To populate the view, the dimensional zonemap query selects rows from the clustered fact table and joins them with rows of one or more dimension tables. The join is based on foreign key columns of the fact table and unique key columns of the dimension tables.

According to an aspect of the present invention, the dimensional zonemap query groups the selected fact table rows into zones by invoking a "zone identifier assignment" function. The zone identifier assignment function maps row identifiers of rows selected from the fact table to zones of the dimensional zonemap. More specifically, all rows selected from the clustered fact table within the same N contiguous data blocks are mapped to the same zone, where N is based on the zonemap scale of the dimensional zonemap. In addition, the dimensional zonemap query calculates the minimum value and maximum value for each zone for each zoned column and stores the calculated values in the materialized view.

For example, consider a sales fact table clustered based on the region and the subregion columns of a countries dimension table according to the following clustering criteria specified in the following CREATE TABLE DDL statement.

```
CREATE TABLE sales
(
    prod_id number not null,
    cust_id number not null, ...
    amount_sold number(10,2)
)
CLUSTERING
    sales JOIN countries ON (sales.country_id = countries.country_id)
    BY LINEAR ORDER (countries.region, countries.subregion)
    YES ON LOAD YES ON DATA MOVEMENT
```

To take advantage of the sales fact table clustered based on the above clustering criteria, a dimensional zonemap on the sales fact table may be generated by the following dimensional zonemap query.

```
CREATE MATERIALIZED ZONEMAP sales_zmap AS
SELECT SYS_OP_ZONE_ID(f.rowid),
       MIN(c. region), MAX(c.region),
       MIN(c.subregion), MAX(c. subregion)
FROM sales f LEFT JOIN countries c ON
       (f.country_id = c.country_id)
GROUP BY SYS_OP_ZONE_ID(f.rowid)
```

Here, a left outer join between the sales fact table and the countries dimension table is performed to ensure that all rows selected from the sales fact table for the join are taken into account in the zonemap. The SYS_OP_ZONE_ID function is the zone identifier assignment function. The SYS_OP_ZONE_ID function maps the input row identifier to a zone identifier. According to the SYS_OP_ZONE_ID, all row identifiers belonging to a contiguous set of N data blocks of the sales fact table are mapped to the same zone, where N is the zonemap scale. The GROUP BY sub-clause is used to properly calculate the minimum value and maximum value for the two zoned columns (countries.region and countries.subregion) per zone. The resulting materialized view, sales_zmap, will have five columns, one column storing zone identifiers and two columns for each the two zoned columns storing the minimum and maximum values calculated per zone.

Figure 6:
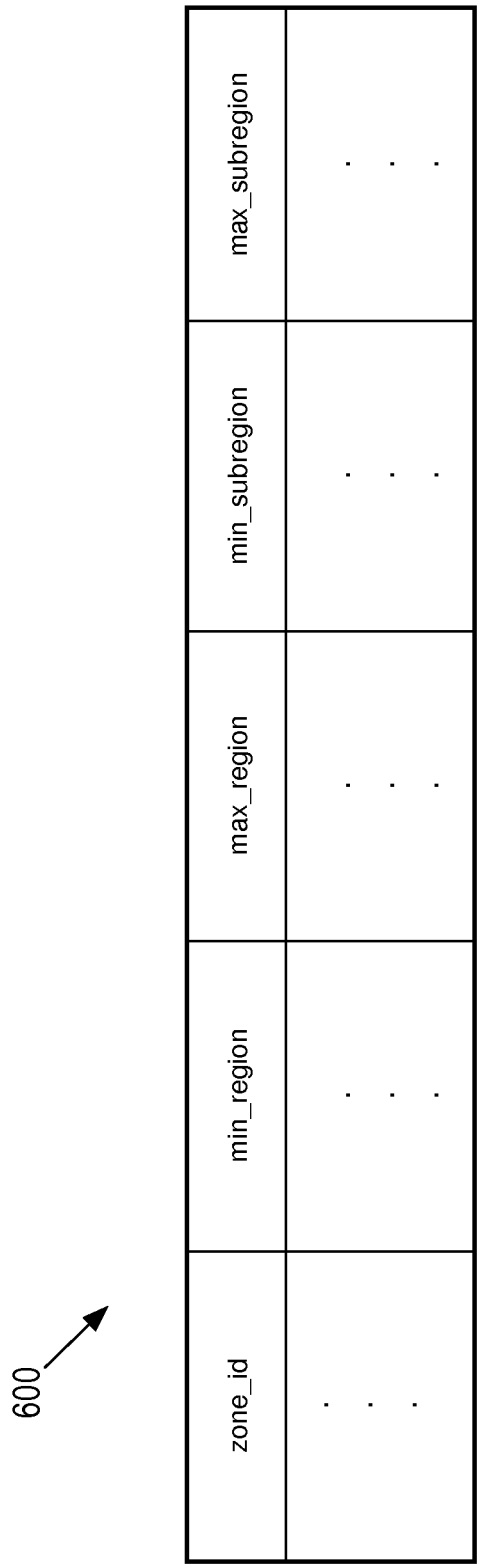
FIG. 6 illustrates the table structure of a possible dimensional zonemap, according to an embodiment of the present invention.

The column structure of the sales_zmap materialized view is illustrated in FIG. 6. As shown, the materialized view 600 has a column for storing zone identifiers (zone_id) and two columns for each of the countries.region and countries.subregion columns storing the minimum and maximum values calculated for the zones. Each row of the view 600 corresponds to one zone of the sales_zmap dimensional zonemap.

As mentioned, a dimensional zonemap facilitates scan pruning of a fact table when executing star queries containing filter predicates on columns of dimension tables. For example, the sales_zmap dimensional zonemap can be used by a database server to facilitate I/O pruning when executing the following query.

```
SELECT country_name, SUM(sales)
FROM sales f JOIN countries ON
(sales.country_id = countries.country_id)
WHERE countries.region='Europe' AND
countries.subregion='West Europe'
GROUP BY countries.name
```

Here, the query on the sales fact table contains two filter predicates, one on each of the zoned columns. These are also columns by which the sales fact table has been clustered in an interleaved order according to the clustering criteria above. Based on this query, a scan of zones for which either one of the filter predicate values (i.e., 'Europe' or 'West Europe') is not within the ranges set by the minimum and maximum values in the dimensional zonemap can be skipped.

If clustering of the fact table is on multiple dimension tables, creation of a dimensional zonemap is analogous to the case where clustering of the fact table is on a single dimension table. For example, if the sales fact table is clustered by countries and products dimension tables instead of just the countries dimension table as in the example above, then the following dimensional zonemap query zonemap may be executed to generate a dimensional zonemap for the sales table.

```
CREATE MATERIALIZED ZONEMAP sales_zmap AS
SELECT SYS_OP_ZONE_ID(f.rowid),
       MIN(countries.region), MAX(countries.region),
       MIN(countries.subregion), MAX(countries.subregion),
       MIN(products.category), MAX(products.category),
       MIN(products.subcategory), MAX(products.subcategory)
FROM sales f LEFT JOIN countries c ON (f.country_id = c.country_id)
       LEFT JOIN products p ON (f.prod_id = p.prod_id)
GROUP BY SYS_OP_ZONE_ID(f.rowid)
```

As with the single dimension case, the dimension zonemap query performs a left outer join between the fact table and each of the dimension tables. As a result, the rows in the fact table are assigned to zones of the zonemap in the order the rows are stored within the fact table (e.g., in the linear or interleaved order determined when the fact table was clustered). In particular, the rows of the fact table stored in the first N disk blocks of the fact table are assigned to the first zone of the zonemap, the rows of the fact table stored in the next N disk blocks of the fact table are assigned to the second zone of the zonemap, and so on, where N is the zonemap scale.

Creating a Dimensional Zonemap

As mentioned, a dimensional zonemap for a fact table may be created with a dimensional zonemap query. Internally, the zonemap may be implemented by the database server as a materialized view. According to one embodiment of the present invention, the dimensional zonemap query is a DDL statement beginning with the keywords "CREATE MATERIALIZED ZONEMAP". Examples of CREATE MATERIALIZED ZONEMAP DDL statement are provided in this description according to a particular syntax. Of course, other syntaxes may be used to convey the same semantics.

A dimensional zonemap query for creating a dimensional zonemap has a number of characteristics. For one, a dimensional zonemap query may reference a fact table and one or more dimension tables, with each dimension table left outer joined to the fact table. That is, the fact table is on the left of every join to a dimension table in the dimensional zonemap query. This ensures that all rows of the fact table are considered in the zonemap. Second, a dimensional zonemap query contains a select sub-query. The select sub-query contains a single invocation of the zone identifier assignment function, along with pairs of minimum and maximum function invocations on columns of the fact table and/or columns of the dimension tables. Third, a dimensional zonemap query contains a GROUP BY clause containing a single invocation of the zone identifier assignment function. The zone identifier assignment function is implemented by the database server and accepts, as input, an identifier of a row in the fact and returns, as output, an identifier of a zone of the dimensional zonemap to which the input fact table is row is assigned. The assignment is based on the disk blocks of the fact table in which the row is stored and the zonemap scale of the dimensional zonemap. An example of a dimensional zonemap query is:

```
CREATE MATERIALIZED ZONEMAP sales_zmap AS
SELECT SYS_OP_ZONE_ID(f.rowid),
    MIN(countries.region), MAX(countries.region),
    MIN(countries.subregion), MAX(countries.subregion),
    MIN(products.category), MAX(products.category),
    MIN(products.subcategory), MAX(products.subcategory)
FROM sales f LEFT JOIN countries c ON (f.country_id = c.country_id)
    LEFT JOIN products p ON (f.prod_id = p.prod_id)
GROUP BY SYS_OP_ZONE_ID(f.rowid)
```

According to one embodiment, the zonemap scaling factor of the dimensional zonemap may be specified in a dimensional zonemap query. For example, in the following dimensional zonemap query a zonemap scaling factor of 8 is specified. Consequently, each zone of the dimensional zonemap will span at most $2^8$ or 256 disk blocks. In the absence of an explicit zonemap scaling factor, the database server may use a default zonemap scaling factor.

```
CREATE MATERIALIZED ZONEMAP sales_zmap SCALE 8 AS
SELECT SYS_OP_ZONE_ID(f.rowid),
    MIN(countries.region), MAX(countries.region),
    MIN(countries.subregion), MAX(countries.subregion),
    MIN(products.category), MAX(products.category),
    MIN(products.subcategory), MAX(products.subcategory)
FROM sales f JOIN countries c ON (f.country_id = c.country_id)
    JOIN products p ON (f.prod_id = p.prod_id)
GROUP BY SYS_OP_ZONE_ID(f.rowid)
```

In another embodiment, a dimensional zonemap query is automatically generated and executed by the database server in response to a DDL statement specifying clustering criteria that contains, as a sub-clause of the clustering directive, a directive to create a dimensional zonemap. In one embodiment, the clustering criteria directive to create a dimensional zonemap based on clustering criteria contains the keywords 'WITH MATERIALIZED ZONEMAP'. For example, the following DDL statement with clustering criteria creates a 'sales' fact table and clusters the 'sales' fact table according to a linear sort order based on values in the 'countries.region' and 'countries.subregion' columns of the 'countries' dimension table. The clustering criteria also specifies that a dimension zonemap should be created when clustering the 'sales' fact table.

```
CREATE TABLE sales
(
    prod_id number not null,
    cust_id number not null, ...
    amount_sold number(10,2)
)
CLUSTERING
    sales JOIN countries ON (sales.country_id = countries.country_id)
    BY LINEAR ORDER (countries.region, countries.subregion)
    YES ON LOAD YES ON DATA MOVEMENT
    WITH MATERIALIZED ZONEMAP (sales_zmap)
```

In response to the above DDL statement, after the 'sales' fact table has been clustered according to the clustering criteria specified in the DDL statement, the database server may create the following dimensional zonemap query to create the requested zonemap:

```
CREATE MATERIALIZED ZONEMAP sales_zmap AS
SELECT SYS_OP_ZONE_ID(sales.rowid),
    MIN(countries.region), MAX(countries.region),
    MIN(countries.subregion), MAX(countries.subregion)
FROM sales LEFT JOIN countries ON
    (sales.country_id = countries.country_id)
GROUP BY SYS_OP_ZONE_ID(sales.rowid)
```

Scan Pruning

According to one embodiment of the present invention, a dimensional zonemap of a fact table is used by a database server during a table scan of the fact table. The dimensional zonemap is used by the database server for I/O pruning. In particular, the database server uses the dimensional zonemap to skip entire zones of disk blocks during the table scan. Since the zoned columns of the dimensional zonemap may be columns of the dimension tables, scan pruning based on filter predicates on the dimension tables in a star query is possible.

Figure 7:
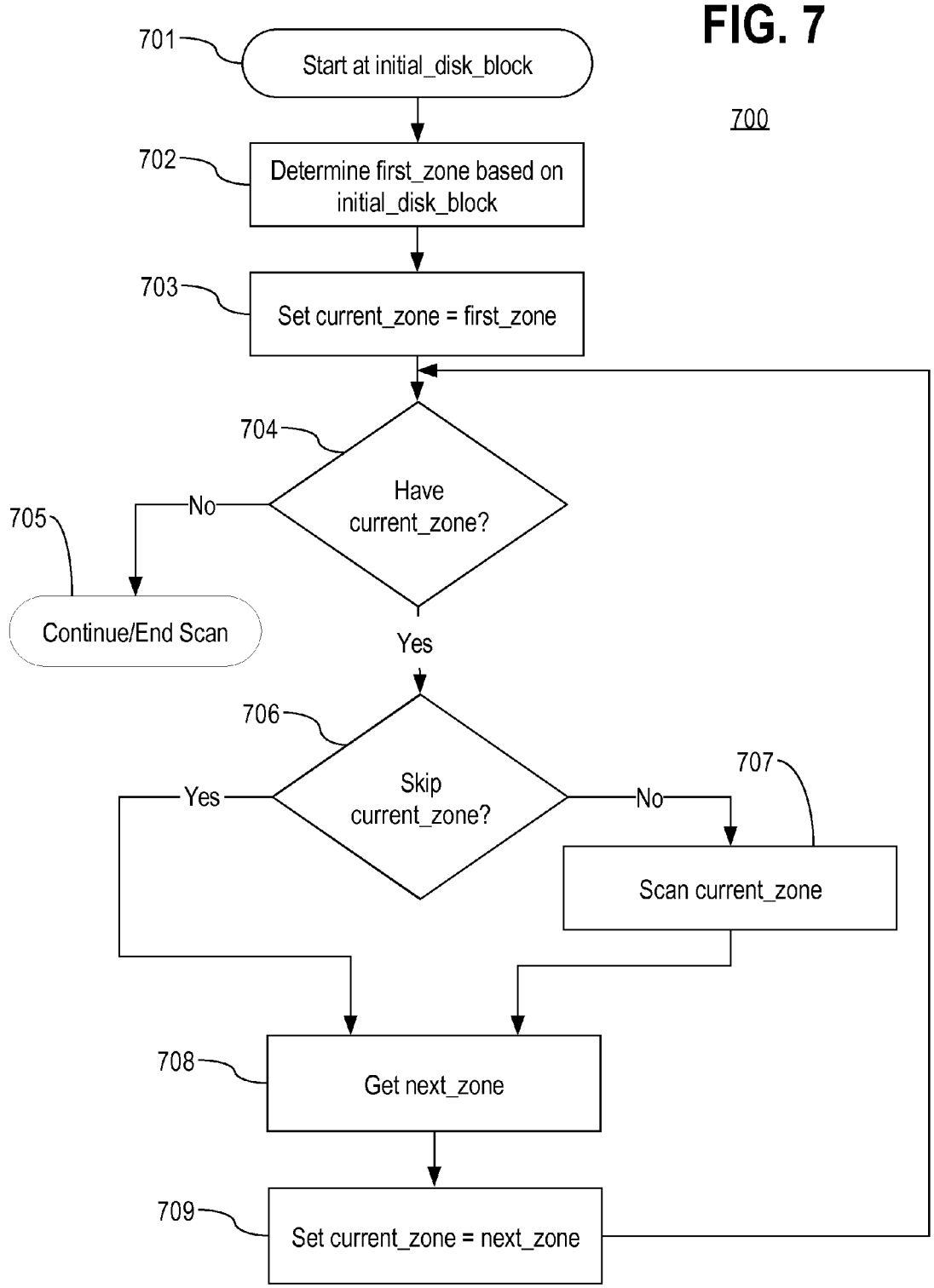
FIG. 7 is a flowchart of a disk scan performed by a database server, according to an embodiment of the present invention.

FIG. 7 is a flowchart of a disk scan 700 of a fact table using a dimensional zonemap, according to an embodiment of the present invention. The scan 700 may be performed by a database server in the context of executing a star query or other query against the fact table that contains filter predicates on one or more zoned columns of the dimensional zonemap.

The query may contain filter predicates on just the fact table, just one or more dimension tables, or on both the fact table and one or more dimension tables. The zoned columns may be just columns of the fact table, just columns of one or more dimension tables, or columns from both the fact table and one or more dimension tables.

The zoned columns may be a variety of different data types including numeric, timestamp, row identifier, float, double, and character data types. As discussed above, a filter predicate on a zoned column in the query can: (1) be a relational predicate of the form "zoned column C <predicate operator> constant V", where <predicate operator> is the equality operator (e.g., "="), the less than or equal to operator (e.g., "<="), the less than operator (e.g., "<"), the greater than operator (e.g., ">"), the greater than or equal to operator (e.g., ">="), or the not equal to operator (e.g., "<>"), (2) contain an IN list that specifies a list of alternative constant values, for example, "where countries.region IN ('Western Europe', 'Eastern Europe')", or (3) contain a LIKE operator with a constant character string value or a constant character string value that prefixes a wildcard operator, for example, "countries.region LIKE 'Western %'").

The query may combine filter predicates, including filter predicates on columns other than zoned columns, with conjunctions, disjunctions, or a mix of conjunctions and disjunctions into an expression which corresponds to the WHERE clause of the query. Depending on the construction of the WHERE clause expression in terms of conjunctions and disjunctions, if all of one or more of all the filter predicates on zoned columns in the expression are not satisfied, then the expression as a whole may not be able to be satisfied. For example, if either of the two filter predicates in the expression "WHERE countries.region='Europe' AND countries.subregion='West Europe' is not satisfied, then the expression as a whole cannot be satisfied. As another example, if both of the filter predicates in the expression "WHERE countries.region='Europe' OR countries.subregion='West Europe' are not satisfied, then the expression as a whole cannot be satisfied by that row.

A minimum set of filter predicates on zoned columns in a WHERE clause expression of a query that, if any are not satisfied, means that the expression as a whole cannot be satisfied is referred to hereinafter as a set of "pruning" filter predicates of the query. The set of pruning filter predicates of a query may be a strict subset of all filter predicates on zoned columns in the query when the WHERE clause expression combines filter predicates in the conjunctive. The dimensional zonemap may be used for I/O pruning during the scan 700 of the fact table when the query against the fact table has a non-empty set of pruning filter predicates. If the query has an empty set of pruning filter predicates, then the dimensional zonemap cannot provide I/O pruning benefits for that query. The following description of the scan 700 of FIG. 7 assumes that the query executing against the fact table has a non-empty set of pruning filter predicates.

Initially, the scan 700 begins (block 701) at an initial disk block of the fact table. The initial disk block may be the first disk block of the fact table, or subsequent disk block of the fact table corresponding to a first row identifier in a specified range of row identifiers of the fact table to scan. Recall that the disk blocks of the fact table are consecutively numbered. Thus, there is a sequential order to the disk blocks that make up the fact table.

Next, the zone of the dimensional zonemap containing the initial disk block is determined (block 702). Generally, this involves mapping the disk block number of the initial disk block to a zone of the dimensional zonemap that covers a range of disk blocks that includes the initial disk block. For this purpose, the database server may maintain a mapping between disk block numbers of zone identifiers. As one example of a possible mapping, the dimensional zonemap may have a unique key column that stores the number of the first disk block in each zone of the dimensional zonemap.

As an example of a possible mapping between disk block numbers and zones of the dimensional zonemap, FIG. 8 illustrates the column structure of a dimensional zonemap 800 having a column 813 storing starting disk block numbers for zones of the dimensional zonemap 800. In particular, according to the dimensional zonemap 800, the zone with zone identifier 1 starts at disk block number 1 and the zone with zone identifier 2 starts at disk block number 3. Since disk block numbers are sequential, if the values of the starting disk block number column are taken in order, then the values of the starting disk numbers form ranges of disk blocks covered by the zones of the dimensional zonemap. Further, the zonemap scale of a dimensional zonemap is established when the dimensional zonemap is created. Thus, the zonemap scale of the dimensional zonemap is known at the time of the scan 700. For example, the zonemap scale of the dimensional zonemap 800 is two (2). Thus, in dimensional zonemap 800, zone 1 covers disk blocks 1 through 2 and zone 2 covers disk blocks 3 through 4.

The remaining steps 703-709 of the scan 700 represents an iteration over a list of zones of the dimensional zonemap starting at the first zone determined in step 702 and proceeding to the last zone in the list. The order of the zones in the list corresponds to the order of the disk blocks covered by the zones on disk. Thus, the iteration over the list of zones from the first zone to the last zone represents a sequential scan of the fact table starting from the initial disk block of the first zone to the last disk block of the last zone. Some of the zones in the list may be skipped depending on the minimum and maximum values stored in the dimensional zonemap. At step 703, the iteration starts with a current zone variable being set to the first zone.

At step 704, a check is made to determine whether current zone variable refers to a zone of the dimensional zonemap. The current zone variable may not refer to a zone of the dimensional zonemap if the initial disk block is not within any zone of the zonemap. In this case, a full scan of the fact table starting at the initial disk block is performed (block 705). The current zone variable may also not refer to a zone of the dimensional zonemap after step 709, if the last zone in the list of zones has been processed. In this case, the scan 700 ends if there are no more disk blocks of the fact table to scan, or the scan 700 continues from the first disk block after the last disk block of the last zone.

If the current zone variable refers to a zone of the dimensional zonemap, then, at step 705, the database server determines whether a scan of the current zone can be skipped. This determination is made based on a set of one or more pruning filter predicates of the query and the minimum and maximum values for the zoned columns, as recorded for the current zone in the dimensional zonemap. In particular, for a given pruning filter predicate in the set, the predicate value or values of the pruning filter predicate are compared to the minimum and/or maximum value for the zoned column of the pruning filter predicate, as recorded for the zone in the dimensional zonemap. The comparison is performed to determine whether the current zone can possibly contain rows of the fact table that satisfy the pruning filter predicate. Specifically, if the pruning filter predicate specifies a zoned column of a dimension table, then the comparison is performed to determine whether the current zone can possibly contain rows of the fact table that, if joined with the dimension table, satisfy the pruning filter predicate. If the pruning filter predicate specifies a zoned column of the fact table, then the comparison is performed to determine whether the current zone can possible contain rows of the fact table that satisfy the pruning filter predicate. Thus, the zoned columns of the dimensional zonemap are not limited to only columns of the fact table but can include columns of dimension tables or be exclusively columns of the dimension tables. If any one of the pruning filter predicates in the set cannot possibly be satisfied by the rows of the current zone, then the scan 700 can skip a disk scan of the disk blocks of the current zone. If each and every pruning filter predicates in the set can possibly be satisfied by the rows of the current zone, then the scan 700 cannot skip the current zone and a disk scan of the disk blocks of the current zone is performed.

When comparing the predicate value or values of the pruning filter predicate to the minimum and/or maximum value for the zoned column of the pruning filter predicate, as recorded for the zone in the dimensional zonemap, the comparison performed depends on the type of pruning filter predicate. In general, the pruning filter predicate can be one of three different types: (1) the pruning filter predicate can be a relational predicate of the form "zoned column C <predicate operator> constant V", (2) the pruning filter predicate can contain an IN list that specifies a list of alternative constant values, or (3) the pruning filter predicate can contain a LIKE operator with a constant character string value or a constant character string value that prefixes a wildcard operator.

Where the pruning filter predicate is a relational predicate, the <predicate operator> can be the equality operator (e.g., "="), the less than or equal to operator (e.g., "<="), the less than operator (e.g., "<"), the greater than operator (e.g., ">"), the greater than or equal to operator (e.g., ">="), or the not equal to operator (e.g., "<>"). Where the predicate operator is the equality operator, the current zone cannot possibility satisfy the pruning filter predicate if the predicate value V is both less than the minimum value of the column C for the current zone and greater than the maximum value of the column C for the current zone. Where the predicate operator is the less than operator, the current zone cannot possibility satisfy the pruning filter predicate if the predicate value V is less than or equal to the minimum value of the column C for the current zone. Where the predicate operator is the less than or equal to operator, the current zone cannot possibility satisfy the pruning filter predicate if the predicate value V is less than the minimum value of the column C for the current zone. Where the predicate operator is the greater than operator, the current zone cannot possibility satisfy the pruning filter predicate if the predicate value V is greater than or equal to the maximum value of the column C for the current zone. Where the predicate operator is the greater than or equal to operator, the current zone cannot possibility satisfy the pruning filter predicate if the predicate value V is greater than the maximum value of the column C for the current zone. Where the predicate operator is the not equal to operator, the current zone cannot possibility satisfy the pruning filter predicate if the minimum value and the maximum value of the column C for the current zone are equal and the predicate value V equals the minimum and maximum values of the column C for the current zone.

Alternatively, the pruning filter predicate can contain an IN list that specifies a list of alternative constant values, for example, "where countries.region IN ('Western Europe', 'Eastern Europe')". Where the pruning filter predicate contains an IN list, the current zone cannot possibility satisfy the pruning filter predicate if each predicate value V in the IN list is both less than the minimum value of the column C for the current zone and greater than the maximum value of the column C for the current zone.

As yet another alternative, the pruning filter predicate can contain a LIKE operator with a constant character string value or a constant character string value that prefixes a wildcard operator, for example, "countries.region LIKE 'Western'), "countries.region LIKE 'Western %'), "countries.region LIKE 'Western % abc'), or "countries.region LIKE 'Western % abc % def')". In these examples, the string "Western" is a constant character string value and the '%' character is a wildcard operator. Where the pruning filter predicate contains a LIKE operator with a constant character string value or a constant character string value prefixing a wildcard operator, the current zone cannot possibility satisfy the pruning filter predicate if the upper bound on the range of character string values covered by the LIKE operator is less than the minimum value of the column C for the current zone or if the lower bound on the range of character string values covered by the LIKE operator is greater than the maximum value of the column C for the current zone. For example, the current zone cannot possibility satisfy the "countries.region LIKE 'Western %') pruning filter predicate if the upper bound string "Westero" is less than the minimum value of the column C for the current zone or if the lower bound string "Western" is greater than the maximum value of the column C for the current zone.

If each and every pruning filter predicate in the set of pruning filter predicates in the query can possibly be satisfied by the current zone, then a disk scan of the disk blocks of the current zone is performed (step 707). If the current zone is the first zone, then the scan of the current zone starts at the initial disk block and proceeds to the last disk block of the first zone. Since the zones cover contiguous sets of disk blocks and the disk blocks are consecutively numbered, the last disk block of the first zone can be determined from the number of the first disk block of the next zone in the list of zones. If the current zone is not the first zone, then the scan of the current zone starts at the first disk block of the current zone and proceeds to the last disk block of the current zone. Alternatively, if no pruning filter predicate in the query can be satisfied by the current zone, then a scan of the current zone is skipped and the scan proceeds to step 708.

At step 708, the next zone after the current zone in the list of zones is determined. At step 709, the current zone variable is set to the next zone and the scan 700 returns to step 704 to consider the new current zone.

Zonemap Driven Scan

The approach of FIG. 7 for I/O pruning is driven by a scan of the fact table starting an initial disk block. As zones are encountered during the scan of the fact table, the dimensional zonemap is consulted to determine which zones can be skipped. As alternative to scan driven I/O pruning, a zonemap driven scan of the fact table is also possible. Under this alternative approach, the dimensional zonemap is consulted priori to initiating the scan to determine which zones of the dimensional zonemap could possibly satisfy at least one of the pruning filter predicates in the query. This consultation results in ranges of contiguous disk blocks that need to be scanned. The scan is then performed on only these zones and the other zones that could not possibility satisfy any of the pruning filter predicates are not scanned.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 9:
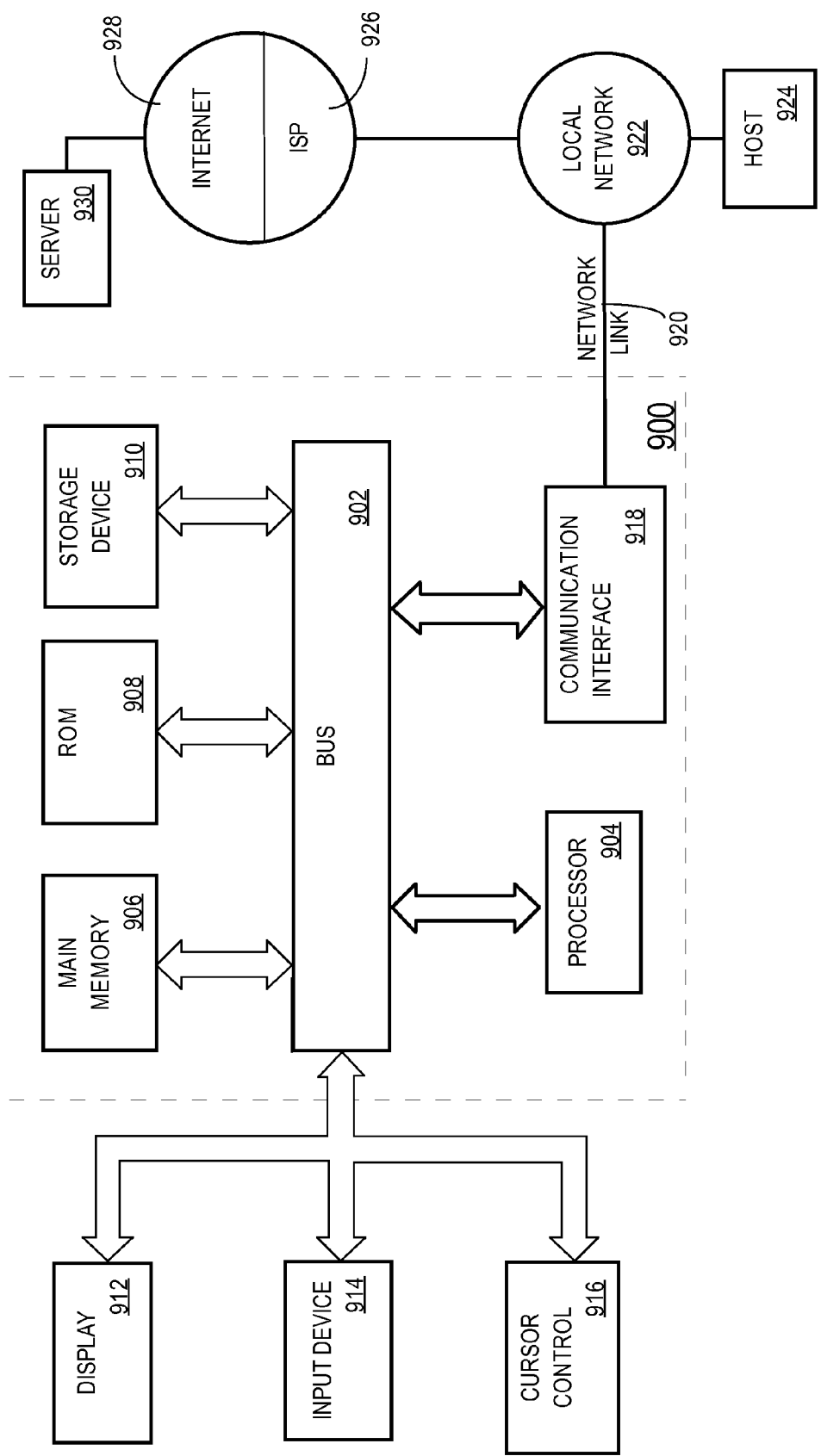
FIG. 9 is a block diagram illustrating a computer system on which embodiments of the invention may be implemented.

For example, FIG. 9 is a block diagram that illustrates a computer system 900 upon which an embodiment of the invention may be implemented. Computer system 900 includes a bus 902 or other communication mechanism for communicating information, and a hardware processor 904 coupled with bus 902 for processing information. Hardware processor 904 may be, for example, a general purpose microprocessor.

Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Such instructions, when stored in non-transitory storage media accessible to processor 904, render computer system 900 into a special-purpose machine that is customized to perform the operations specified in the instructions.

Computer system 900 further includes a read only memory (ROM) 908 or other static storage device coupled to bus 902 for storing static information and instructions for processor 904. A storage device 910, such as a magnetic disk, optical disk, or solid-state drive is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

Computer system 900 may implement the techniques described herein using customized hard-wired logic, one or more ASICs or FPGAs, firmware and/or program logic which in combination with the computer system causes or programs computer system 900 to be a special-purpose machine. According to one embodiment, the techniques herein are performed by computer system 900 in response to processor 904 executing one or more sequences of one or more instructions contained in main memory 906. Such instructions may be read into main memory 906 from another storage medium, such as storage device 910. Execution of the sequences of instructions contained in main memory 906 causes processor 904 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 910. Volatile media includes dynamic memory, such as main memory 906. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 902. Transmission media can also take the form of acoustic or light waves, such as those generated during radio-wave and infra-red data communications.

Various forms of media may be involved in carrying one or more sequences of one or more instructions to processor 904 for execution. For example, the instructions may initially be carried on a magnetic disk or solid-state drive of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card, cable modem, satellite modem, or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are example forms of transmission media.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918.

The received code may be executed by processor 904 as it is received, and/or stored in storage device 910, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-implemented method comprising:
dividing disk blocks of a target table into a plurality of zones, each zone of the plurality of zones being defined by a respective set of contiguous disk blocks on disk, the respective set of contiguous disk blocks on disk containing data of one or more rows of the target table;
determining, for each zone of the plurality of zones, a minimum column value and a maximum column value for each of one or more zoned columns of one or more tables;
wherein each zone of the plurality of zones corresponds to a respective set of data in the one or more zoned columns;
wherein, for each zone of the plurality of zones, the minimum column value and maximum column value determined for each zoned column of the one or more zoned columns is determined based on the respective set of data, in the one or more zoned columns, corresponding to the zone;
wherein at least one of the one or more zoned columns is not a column of target table;
receiving a query on the target table;
wherein the query contains a filter predicate on a particular column of the one or more zoned columns;
wherein the filter predicate has a predicate value;
determining, based on the predicate value and the minimum column values and the maximum column values maintained for the particular column, one or more zones, of the plurality of zones, that cannot possibly contain rows of the target table satisfying the query;
wherein the method is performed by one or more computing devices.

2. The method of claim 1, further comprising:
returning an answer to the query without performing a disk scan of the one or more zones, of the plurality of zones, that cannot possibly contain rows of the target table satisfying the query.

3. The method of claim 1, wherein the particular column is not a column of the target table.

4. The method of claim 1, wherein none of the one or more zoned columns is a column of the target table; and wherein the one or more zoned columns is a plurality of zoned columns.

5. The method of claim 1, wherein the target table is a fact table of a star schema and the particular column is a column of a dimension table of the star schema.

6. The method of claim 1, wherein the particular column is not a column of the target table, and wherein dividing disk blocks of the target table into a plurality of zones comprises:
performing a left outer join between the target table and the table having the particular column to produce a set of joined rows, each joined row of the set of joined rows corresponding to one row of the target table; and
for each joined row in the set of joined rows, assigning the corresponding row of the target table to one zone of the plurality of zones.

7. The method of claim 1, wherein each zone of the plurality of zones has at most a predetermined number of contiguous disk blocks.

8. The method of claim 1, wherein maintaining, for each zone of the plurality of zones, a minimum column value and a maximum column value for each of the one or more zoned columns comprises maintaining a materialized view in a database, the materialized view including one row for each zone of the plurality of zones, one column for each of the one or more zoned columns storing the minimum column values for the zoned column, and one column for each of the one or more columns storing the maximum column values for the zoned column.

9. The method of claim 1, wherein the filter predicate contains a LIKE operator and the predicate value has a constant character string value or a constant character string value prefixing a wildcard operator.

10. The method of claim 1, wherein the particular column is not a column of the target table, and wherein the query contains join criteria, the join criteria specifying a join between the target table and the table having the particular column, the join criteria further specifying that the join is to be based on a foreign key column of the target table and a unique key column of the table having the particular column.

11. The method of claim 1, wherein the particular column has a database data type; and wherein the database data type is selected from the group consisting of numeric, character, date, timestamp, row identifier, float, and double.

12. One or more non-transitory computer-readable media storing at least one program configured for execution by at least one processor, the at least one program comprising instructions to:
dividing disk blocks of a target table into a plurality of zones, each zone of the plurality of zones being defined by a respective set of contiguous disk blocks on disk, the respective set of contiguous disk blocks on disk containing data of one or more rows of the target table;
determining, for each zone of the plurality of zones, a minimum column value and a maximum column value for each of one or more zoned columns of one or more tables;
wherein each zone of the plurality of zones corresponds to a respective set of data in the one or more zoned columns;
wherein, for each zone of the plurality of zones, the minimum column value and maximum column value determined for each zoned column of the one or more zoned columns is determined based on the respective set of data, in the one or more zoned columns, corresponding to the zone;
wherein at least one of the one or more zoned columns is not a column of target table;
receive a query on the target table;
wherein the query contains a filter predicate on a particular column of the one or more zoned columns;
wherein the filter predicate has a predicate value;
determine, based on the predicate value and the minimum column values and the maximum column values maintained for the particular column, one or more zones, of the plurality of zones, that cannot possibly contain rows of the target table satisfying the query.

13. The one or more non-transitory computer-readable media of claim 12, the at least one program further comprising instructions to:
return an answer to the query without performing a disk scan of the one or more zones, of the plurality of zones, that cannot possibly contain rows of the target table satisfying the query.

14. The one or more non-transitory computer-readable media of claim 12, wherein the particular column is not a column of the target table.

15. The one or more non-transitory computer-readable media of claim 12, wherein none of the one or more zoned columns is a column of the target table; and wherein the one or more zoned columns is a plurality of zoned columns.

16. The one or more non-transitory computer-readable media of claim 12, wherein the target table is a fact table of a star schema and the particular column is a column of a dimension table of the star schema.

17. The one or more non-transitory computer-readable media of claim 12, wherein the particular column is not a column of the target table, and wherein the instructions to divide contiguous disk blocks of the target table into a plurality of zones comprise instructions to:
perform a left outer join between the target table and the table having the particular column to produce a set of joined rows, each joined row of the set of joined rows corresponding to one row of the target table; and
for each joined row in the set of joined rows, assign the corresponding row of the target table to one zone of the plurality of zones.

18. The one or more non-transitory computer-readable media of claim 12, wherein each zone of the plurality of zones has at most a predetermined number of contiguous disk blocks.

19. The one or more non-transitory computer-readable media of claim 12, wherein the instructions to maintain, for each zone of the plurality of zones, a minimum column value and a maximum column value for each of the one or more zoned columns comprise instructions to maintain a materialized view in a database, the materialized view including one row for each zone of the plurality of zones, one column for each of the one or more zoned columns storing the minimum column values for the zoned column, and one column for each of the one or more columns storing the maximum column values for the zoned column.

20. The one or more non-transitory computer-readable media of claim 12, wherein the filter predicate contains a LIKE operator and the predicate value has a constant character string value or a constant character string value prefixing a wildcard operator.

21. The one or more non-transitory computer-readable media of claim 12, wherein the particular column is not a column of the target table, and wherein the query contains join criteria, the join criteria specifying a join between the target table and the table having the particular column, the join criteria further specifying that the join is to be based on a foreign key column of the target table and a unique key column of the table having the particular column.

22. The one or more non-transitory computer-readable media of claim 12, wherein the particular column has a database data type; and wherein the database data type is selected from the group consisting of numeric, character, date, timestamp, row identifier, float, and double.

* * * * *

UNITED STATES PATENT AND TRADEMARK OFFICE
CERTIFICATE OF CORRECTION

PATENT NO. : 10,223,422 B2
APPLICATION NO. : 14/671510
DATED : March 5, 2019
INVENTOR(S) : Ziauddin et al.

Page 1 of 1

It is certified that error appears in the above-identified patent and that said Letters Patent is hereby corrected as shown below:

In the Specification

In Column 23, Line 2, delete "Europe'" and insert -- Europe'" --, therefor.

In Column 23, Line 6, delete "Europe'" and insert -- Europe'" --, therefor.

Signed and Sealed this
Twenty-fifth Day of February, 2020

Andrei Iancu
*Director of the United States Patent and Trademark Office*